United States Patent
Gopal et al.

(10) Patent No.: US 12,016,079 B2
(45) Date of Patent: Jun. 18, 2024

(54) TECHNIQUES FOR ANTENNA SWITCHING MANAGEMENT IN A MULTIPLE SUBSCRIBER IDENTITY MODULE MODE

(71) Applicant: QUALCOMM Incorporated, San Diego, CA (US)

(72) Inventors: Thawatt Gopal, San Diego, CA (US); Sridhar Bandaru, Westminster, CO (US); Vishal Mahajan, Dublin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 17/647,663

(22) Filed: Jan. 11, 2022

(65) Prior Publication Data

US 2022/0248206 A1    Aug. 4, 2022

Related U.S. Application Data

(60) Provisional application No. 63/143,607, filed on Jan. 29, 2021.

(51) Int. Cl.
*H04W 8/18* (2009.01)
*H04L 5/14* (2006.01)
*H04W 88/06* (2009.01)

(52) U.S. Cl.
CPC ............... *H04W 8/18* (2013.01); *H04L 5/14* (2013.01); *H04W 88/06* (2013.01)

(58) Field of Classification Search
CPC ....... H04W 8/18; H04W 88/06; H04W 8/183; H04L 5/14; H04L 5/1469
USPC ........................................ 455/435.1
See application file for complete search history.

(56) References Cited

U.S. PATENT DOCUMENTS

| | | | |
|---|---|---|---|
| 6,385,464 B1 | 5/2002 | Narita et al. | |
| 11,696,176 B2* | 7/2023 | Dhanapal | H04W 28/06 370/329 |
| 2017/0026876 A1* | 1/2017 | Yang | H04W 74/002 |
| 2017/0048645 A1* | 2/2017 | Yerrabommanahalli | H04L 61/106 |
| 2018/0184309 A1 | 6/2018 | Bhardwaj et al. | |

(Continued)

OTHER PUBLICATIONS

International Search Report and Written Opinion—PCT/US2022/070152—ISA/EPO—dated May 11, 2022.

*Primary Examiner* — Don N Vo
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may establish, using a first frequency band, a first communication connection on a first subscriber identity module (SIM). The UE may establish, using a second frequency band, a second communication connection on a second SIM in a multi-SIM dual receive mode that includes the first SIM and the second SIM having concurrent activity. The UE may switch from a first antenna to a second antenna for the first SIM in accordance with an antenna switching capability that is based at least in part on whether the first communication connection and the second communication connection are time division duplex (TDD) synchronized. The UE may transmit one or more communications associated with the first SIM using the second antenna. Numerous other aspects are described.

30 Claims, 15 Drawing Sheets

(56) References Cited

U.S. PATENT DOCUMENTS

2018/0368098 A1   12/2018  Gopal et al.
2022/0248213 A1*   8/2022  Hong ................... H04W 8/205

* cited by examiner

TECHNIQUES FOR ANTENNA SWITCHING MANAGEMENT IN A MULTIPLE SUBSCRIBER IDENTITY MODULE MODE

CROSS-REFERENCE TO RELATED APPLICATION

This Patent application claims priority to U.S. Provisional Patent Application No. 63/143,607, filed on Jan. 29, 2021, entitled "TECHNIQUES FOR ANTENNA SWITCHING MANAGEMENT IN A MULTI-SIM MODE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for antenna switching management in a multiple subscriber identity module (SIM) mode.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes establishing, using a first frequency band, a first communication connection on a first subscriber identity module (SIM); establishing, using a second frequency band, a second communication connection on a second SIM in a multi-SIM dual receive mode that includes the first SIM and the second SIM having concurrent activity; switching from a first antenna to a second antenna for the first SIM in accordance with an antenna switching capability that is based at least in part on whether the first communication connection and the second communication connection are time division duplex (TDD) synchronized; and transmitting one or more communications associated with the first SIM using the second antenna.

In some aspects, a UE for wireless communication includes a memory and one or more processors coupled to the memory. The one or more processors may be configured to establish, using a first frequency band, a first communication connection on a first SIM; establish, using a second frequency band, a second communication connection on a second SIM in a multi-SIM dual receive mode that includes the first SIM and the second SIM having concurrent activity; switch from a first antenna to a second antenna for the first SIM in accordance with an antenna switching capability that is based at least in part on whether the first communication connection and the second communication connection are TDD synchronized; and transmit one or more communications associated with the first SIM using the second antenna.

In some aspects, a non-transitory computer-readable medium storing a set of instructions for wireless communication includes one or more instructions that, when executed by one or more processors of a UE, cause the UE to establish, using a first frequency band, a first communication connection on a first SIM; establish, using a second frequency band, a second communication connection on a second SIM in a multi-SIM dual receive mode that includes the first SIM and the second SIM having concurrent activity; switch from a first antenna to a second antenna for the first SIM in accordance with an antenna switching capability that is based at least in part on whether the first communication connection and the second communication connection are TDD synchronized; and transmit one or more communications associated with the first SIM using the second antenna.

In some aspects, an apparatus for wireless communication includes means for establishing, using a first frequency band, a first communication connection on a first SIM; means for establishing, using a second frequency band, a second communication connection on a second SIM in a multi-SIM dual receive mode that includes the first SIM and the second SIM having concurrent activity; means for switching from a first antenna to a second antenna for the first SIM in accordance with an antenna switching capability that is based at least in part on whether the first communication connection and the second communication connection are TDD synchronized; and means for transmitting one or more communications associated with the first SIM using the second antenna.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
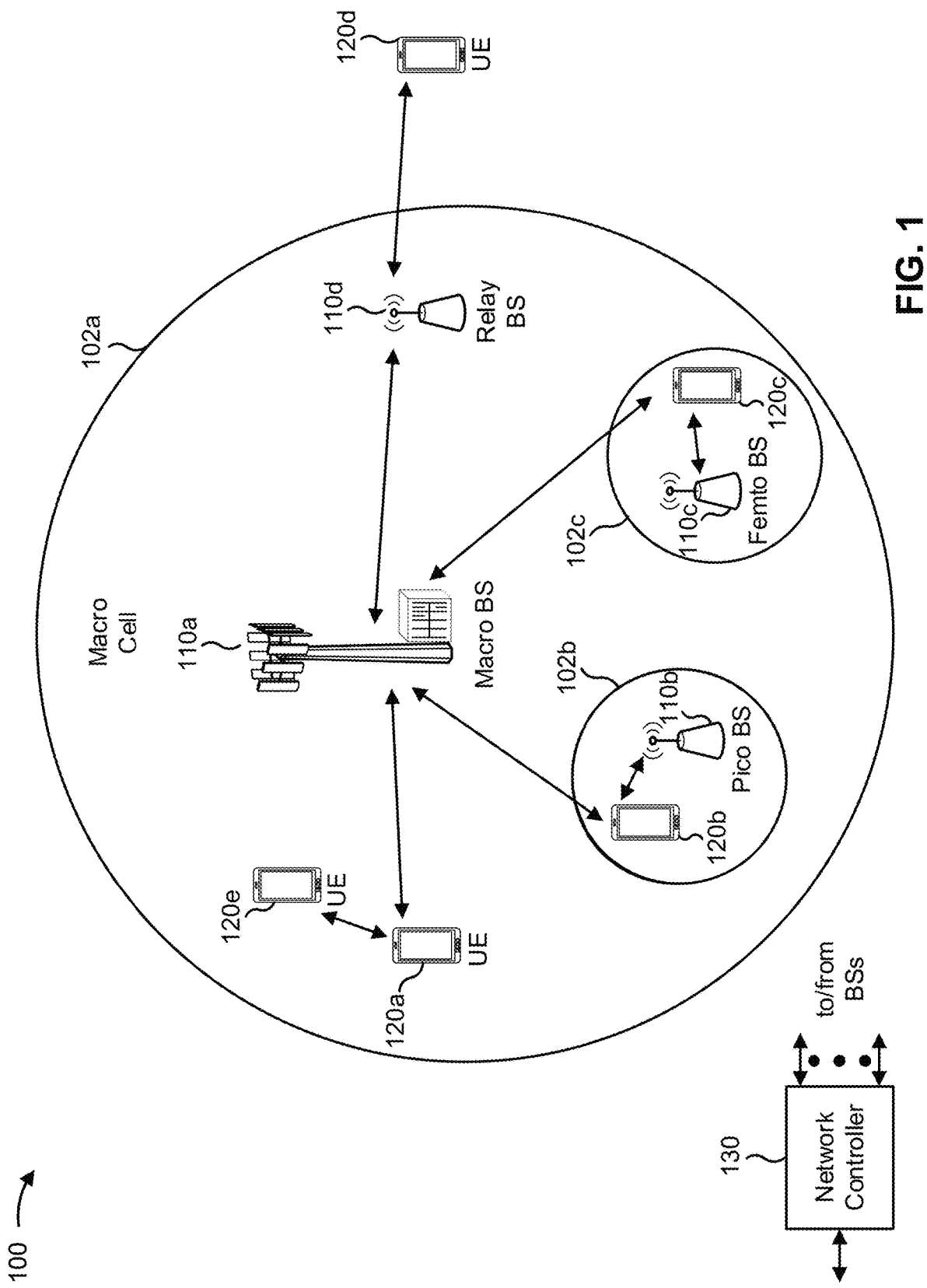
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
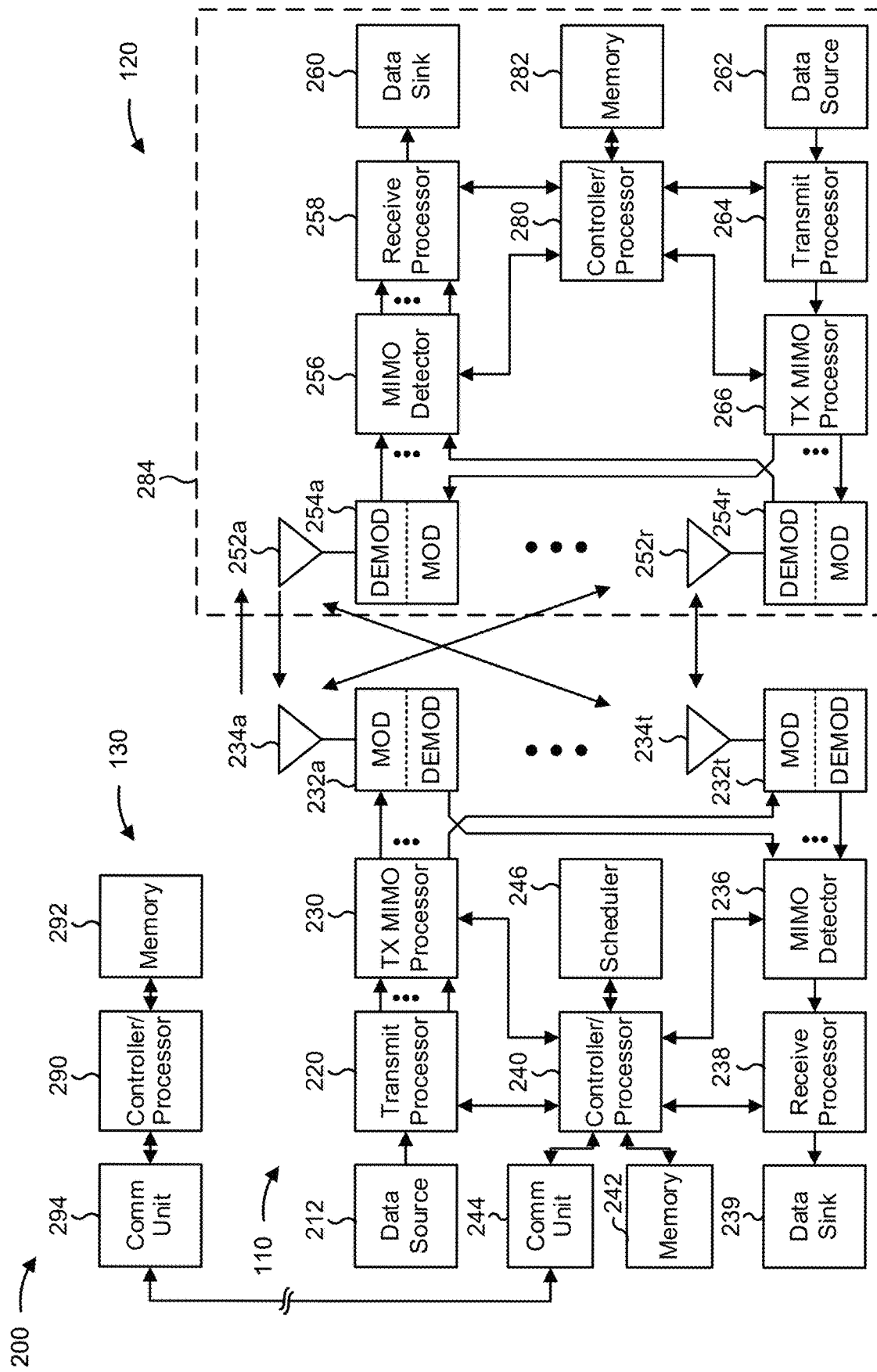
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to Tmodulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with antenna switching management in a multiple subscriber identity module (SIM) mode, as described in more detail elsewhere herein. For example, controller/processor 240 of base station 110, controller/processor 280 of UE 120, and/or any other component(s) of FIG. 2 may perform or direct operations of, for example, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some aspects, executing instructions may include running the instructions, converting the instructions, compiling the instructions, and/or interpreting the instructions.

In some aspects, the UE 120 includes means for establishing, using a first frequency band, a first communication connection on a first SIM; means for establishing, using a second frequency band, a second communication connection on a second SIM in a multi-SIM dual receive mode that includes the first SIM and the second SIM having concurrent activity; means for switching from a first antenna to a second antenna for the first SIM in accordance with an antenna switching capability that is based at least in part on whether the first communication connection and the second communication connection are TDD synchronized; and/or means for transmitting one or more communications associated with the first SIM using the second antenna. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for identifying, based at least in part on the first frequency band and the second frequency band, whether the first communication connection and the second communication connection are TDD synchronized.

In some aspects, the UE 120 includes means for establishing the first communication in a connected mode and means for establishing the second communication in an idle mode.

In some aspects, the UE 120 includes means for identifying a first identifier associated with a first network operator for the first communication connection and the first SIM and/or means for identifying a second identifier associated with a second network operator for the second communication connection and the second SIM.

In some aspects, the UE 120 includes means for identifying whether a first network operator associated with the first communication connection and a second network operator associated with the second communication connection are associated with TDD synchronization for the first frequency band and the second frequency band.

In some aspects, the UE 120 includes means for performing a lookup operation in a database based at least in part on a first identifier associated with the first network operator and a second identifier associated with the second network operator, where the database includes information identifying whether network operators are associated with TDD synchronization for different frequency bands.

In some aspects, the UE 120 includes means for receiving an over-the-air (OTA) message indicating updated information for the database.

In some aspects, the UE 120 includes means for identifying whether a TDD configuration for the first communication connection is a same TDD configuration as a TDD configuration for the second communication connection.

In some aspects, the UE 120 includes means for identifying that the first communication connection and the second communication connection are TDD synchronized for the first frequency band and the second frequency band.

In some aspects, the UE 120 includes means for identifying that the antenna switching capability indicates that the UE is enabled to use each antenna included in a set of antennas of the UE for antenna switching for the first communication connection based at least in part on identifying that the first communication connection and the second communication connection are TDD synchronized for the first frequency band and the second frequency band.

In some aspects, the UE 120 includes means for identifying that the second antenna is a best antenna from a set of antennas of the UE using antenna switching; and/or means for transmitting the one or more communication using the second antenna.

In some aspects, the UE 120 includes means for identifying a subset of antennas, from a set of antennas of the UE, to be associated with receive activity for the second communication connection, where the antenna switching capability indicates that each antenna included in the set of antennas is available to be included in the subset of antennas.

In some aspects, the UE 120 includes means for receiving, using the second communication connection, one or more communications using at least one antenna included in the subset of antennas.

In some aspects, the UE 120 includes means for identifying that the first communication connection and the second communication connection are not TDD synchronized for the first frequency band and the second frequency band.

In some aspects, the UE 120 includes means for identifying that the antenna switching capability indicates that the UE is enabled to use a subset of antennas, from a set of antennas of the UE, for antenna switching for the first communication connection based at least in part on identifying that the first communication connection and the second communication connection are not TDD synchronized for the first frequency band and the second frequency band, In some aspects, the UE 120 includes means for identifying that the second antenna is a best antenna from the subset of antennas using antenna switching and/or means for transmitting the one or more communication using the second antenna.

In some aspects, the UE 120 includes means for identifying a first subset of antennas, from a set of antennas of the UE, to be associated with receive activity for the second communication connection, where the antenna switching capability indicates that the first subset of antennas is to include antennas that are different than antennas included in a second subset of antennas associated with transmit activity for the first communication connection.

In some aspects, the UE 120 includes means for receiving, using the second communication connection, one or more communications using at least one antenna included in the first subset of antennas.

As indicated above, FIG. 2 is provided as an example. Other examples may differ from what is described with regard to FIG. 2.

Figure 3:
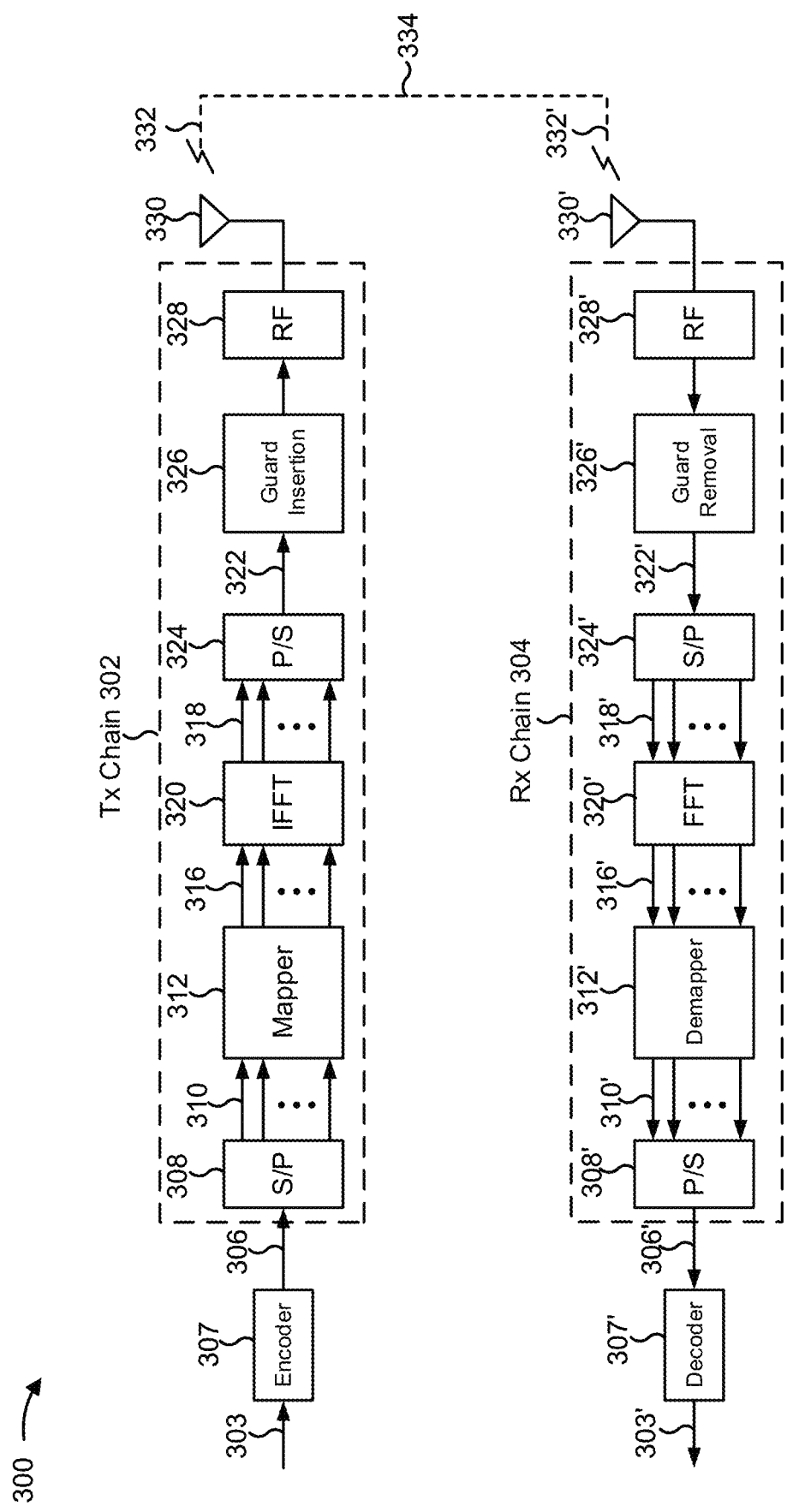
FIG. 3 is a diagram illustrating an example of a transmit (Tx) chain and a receive (Rx) chain of a UE, in accordance with the present disclosure.

FIG. 3 is a diagram illustrating an example 300 of a transmit (Tx) chain 302 and a receive (Rx) chain 304 of a UE, in accordance with the present disclosure. In some aspects, one or more components of Tx chain 302 may be implemented in transmit processor 264, TX MIMO processor 266, MOD/DEMOD 254, and/or controller/processor 280, as described above in connection with FIG. 2. In some aspects, Tx chain 302 may be implemented in UE 120 for transmitting data 306 (e.g., uplink data, an uplink reference signal, and/or uplink control information) to base station 110 on an uplink channel.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 312 may output N parallel symbol streams 316, each symbol stream 316 corresponding to one of N orthogonal subcarriers of an inverse fast Fourier transform (IFFT) component 320. These N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328. An antenna 330 may then transmit the resulting signal 332.

In some aspects, Rx chain 304 may utilize OFDM/OFDMA. In some aspects, one or more components of Rx chain 304 may be implemented in receive processor 258, MIMO detector 256, MOD/DEMOD 254, and/or controller/processor 280, as described above in connection with FIG. 2. In some aspects, Rx chain 304 may be implemented in UE 120 for receiving data 306 (e.g., downlink data, a downlink reference signal, and/or downlink control information) from base station 110 on a downlink channel.

A transmitted signal 332 is shown traveling over a wireless channel 334 from Tx chain 302 to Rx chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
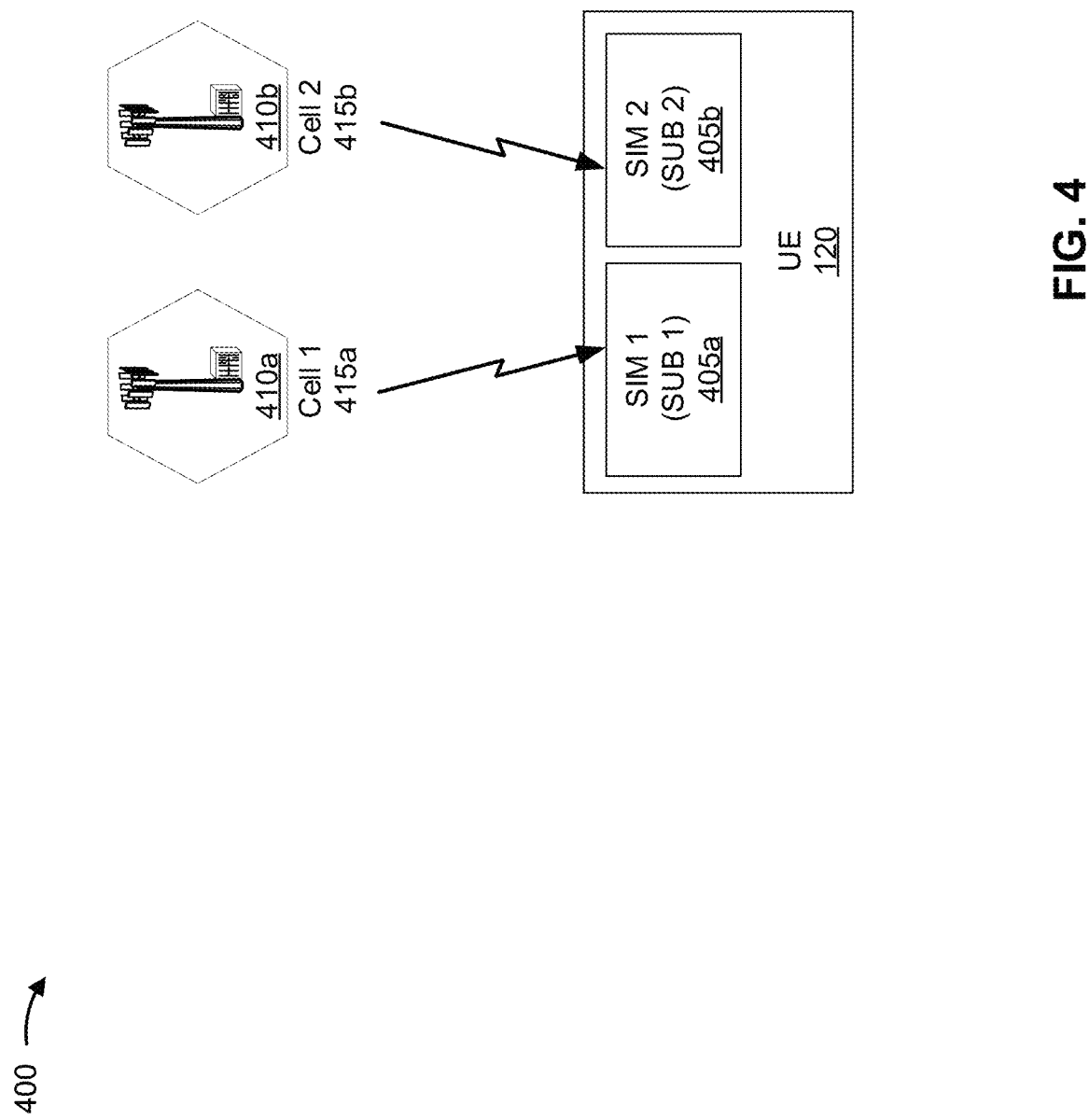
FIG. 4 is a diagram illustrating an example of a multiple subscriber identity module (SIM) UE, in accordance with the present disclosure.

FIG. 4 is a diagram illustrating an example 400 of a multiple SIM (multi-SIM) UE, in accordance with the present disclosure. As shown in FIG. 4, a UE 120 may be a multi-SIM UE that includes multiple SIMs (two or more SIMs), shown as a first SIM 405a and a second SIM 405b. The first SIM 405a may be associated with a first subscription (shown as SUB 1), and the second SIM 405b may be associated with a second subscription (shown as SUB 2). A subscription may include a subscription with a network operator (e.g., a mobile network operator (MNO)) that enables the UE 120 to access a wireless network (e.g., a radio access network (RAN)) associated with the network operator.

A SIM 405 may be a removable SIM (e.g., a SIM card) or an embedded SIM. A SIM 405 may include an integrated circuit that securely stores an international mobile subscriber identity (IMSI) and a security key, which are used to identify and authenticate a corresponding subscription associated with the SIM 405. In some cases, a SIM 405 may store a list of services that the UE 120 has permission to access using a subscription associated with the SIM 405, such as a data service or a voice service, among other examples.

As further shown in FIG. 4, the UE 120 may communicate (e.g., in a connected mode, an idle mode, or an inactive mode) with a first base station 410a via a first cell 415a (shown as Cell 1) using the first SIM 405a. In this case, a first subscription (SUB 1) of the UE 120 may be used to access the first cell 415a (e.g., using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (e.g., in a connected mode, an idle mode, or an inactive mode) with a second base station 410b via a second cell 415b (shown as Cell 2) using the second SIM 405b. In this case, a second subscription (SUB 2) of the UE 120 may be used to access the second cell 415b (e.g., using a second IMSI for UE identification, using a second security key for UE authentication, using a second list of services that the UE 120 is permitted to access using the second subscription, or by counting data or voice usage on the second cell against the second subscription, among other examples).

The first base station 410a and/or the second base station 410b may include one or more of the base stations 110 described above in connection with FIG. 1. Although the first cell 415a and the second cell 415b are shown as being provided by different base stations, in some aspects, the first cell 415 and the second cell 415b may be provided by the same base station. Thus, in some aspects, the first base station 410a and the second base station 410b may be integrated into a single base station.

In some cases, the UE 120 may be a single receiver (SR) (sometimes also referred to as single radio) multi-SIM UE, such as an SR multi-SIM multiple standby (SR-MSMS) UE or a single receiver dual SIM dual standby (SR-DSDS) UE, among other examples. A multi-SIM UE may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, an SR-DSDS UE or an SR-MSMS UE may only be capable of receiving data on one connection at a time because radio frequency resources are shared between the multiple subscriptions. For example, an SR-DSDS UE or an SR-MSMS UE may be associated with multiple subscriptions but may include only a single transceiver shared by the multiple subscriptions, a single transmit chain shared by the multiple subscriptions, or a single receive chain shared by the multiple subscriptions, among other examples.

Alternatively, in some cases, the UE 120 may have dual receive, dual SIM, dual standby (DR-DSDS) capabilities, which may allow both SIMs 405a, 405b to concurrently receive, although only one SIM can transmit at a time (e.g., on a time-sharing basis). For example, transmit and receive operations may be enabled for the first SIM 405a in a connected mode, and only receive operations may be enabled for the second SIM 405b while the first SIM 405a is in connected mode, or vice versa.

When operating as a DR-DSDS device, the UE 120 may participate in a first call, associated with a first SIM, using a first Rx chain of the UE 120 and at least a first Tx chain of UE 120. In some aspects, the UE 120 may also use a second Tx chain of UE 120 in order to support the first call. For example, the UE 120 may be configured for UL carrier aggregation (CA) and/or MIMO operation in order to support transmissions associated with the first call that uses the first SIM.

During operation as the DR-DSDS device, the UE 120 may use a second Rx chain of UE 120 to check a paging channel associated with a second SIM (e.g., concurrently with Tx activity and/or Rx activity of the first SIM). If a second call is detected using the second Rx chain, then the UE 120 may suspend the first call and establish the second call associated with the second SIM. When operating as a DR-DSDS device, the UE 120 may not support dual SIM dual active (DSDA) operation. In other words, when operating as a DR-DSDS device, the UE 120 may maintain a single call associated with a single SIM, but the UE 120 may not concurrently maintain different calls associated with different SIMs.

As indicated above, FIG. 4 is provided as an example. Other examples may differ from what is described with regard to FIG. 4.

Figure 5:
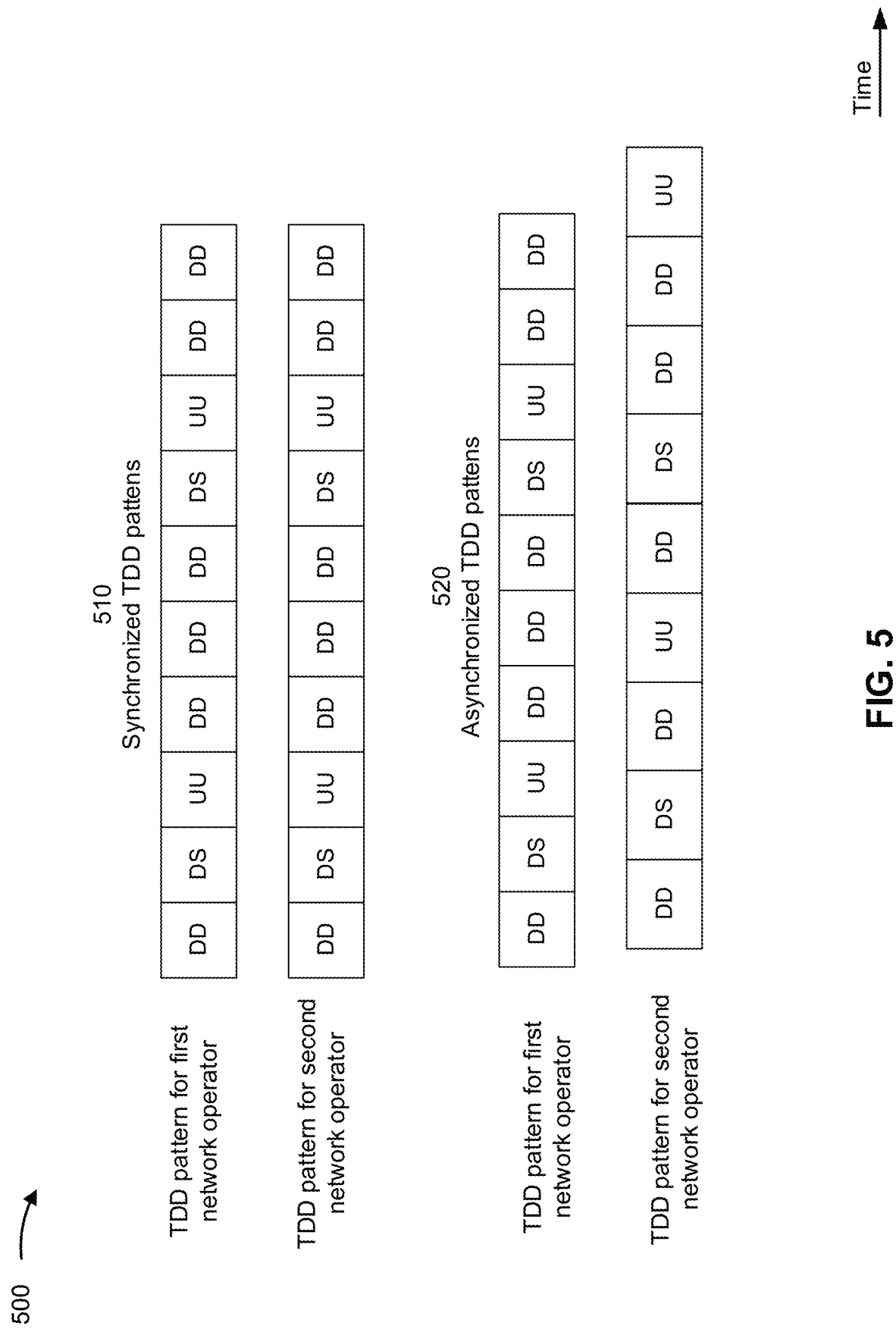
FIG. 5 is a diagram illustrating an example of a time division duplex (TDD) pattern, in accordance with the present disclosure.

FIG. 5 is a diagram illustrating an example 500 of a time division duplex (TDD) pattern, in accordance with the present disclosure. The TDD pattern may be configured by a network (e.g., by a base station 110) in a TDD configuration as part of an initial network access (e.g., when establishing a communication connection with the network).

The TDD pattern may be configured for a SIM of the UE when establishing a communication connection for the SIM. For example, as shown in FIG. 5, the TDD pattern may generally indicate whether a slot is configured as a downlink slot (shown in FIG. 5 as DD) in which Rx activity may be scheduled for the multi-SIM UE, an uplink slot (shown in FIG. 5 as UU) in which Tx activity may be scheduled for the multi-SIM UE, or a special slot (shown in FIG. 5 as DS) in which one or more symbols in an earlier portion of the slot are used for Rx activity and one or more symbols in a later portion of the slot are used to transition from Rx activity to Tx activity. As described in more detail below, a multi-SIM UE may include multiple antennas and an RF front end (RFFE) with multiple antenna switches that allow a Tx chain to select a particular transmit antenna (e.g., based on an antenna switch diversity (Asdiv) technique and/or a sounding reference signal (SRS) antenna switching configuration) via the antenna switches in the RFFE. Accordingly, in a special slot, the multi-SIM UE may prepare and/or program analog and/or digital components in the Tx chain for transmission, which may include toggling one or more antenna switches to connect the Tx chain to a particular transmit antenna.

In some cases, a TDD pattern or TDD configuration may be based at least in part on a network operator (e.g., a mobile network operator (MNO)) associated with the network. For example, different network operators may provide different TDD patterns or TDD configurations. Network operators may provide network access in different operating frequency bands (e.g., different RF bands). Operating frequency bands (e.g., RF bands) may be defined, or otherwise fixed, by a wireless communication standard, such as the 3GPP. In some cases, a frequency band (e.g., or a frequency band group including multiple frequency bands) may be associated with multiple network operators. For example, in NR ultra-high bandwidth (UHB) frequency bands, multiple network operators may provide network access for frequency bands in a UHB frequency band group (such as NR band N77, N78, and/or N79 as defined, or otherwise fixed, by a wireless communication standard, such as the 3GPP).

In some cases, as shown by reference number 510, TDD patterns or TDD configurations associated with different network operators may be synchronized for a frequency band or frequency band group. "TDD synchronization" or "TDD synchronized" may refer to a TDD pattern and a timing or slot boundary configuration of a TDD pattern for a first network operator being the same as a TDD pattern and a timing or slot boundary configuration of a TDD pattern for second network operator for a frequency band or frequency band group. For example, the first network operator and the second network operator may be associated with a network sharing agreement for the frequency band and/or the frequency band group to ensure that TDD patterns are synchronized for the frequency band or the frequency band group. For example, if a multi-SIM UE establishes a communication connection associated with the first network operator on a first SIM (e.g., using the frequency band and/or the frequency band group) and a communication connection associated with the second network operator on a second SIM (e.g., using the frequency band and/or the frequency band group), then the TDD patterns for the first SIM and the second SIM may be synchronized (e.g., may be the same for both SIMs). Therefore, Tx activity on the first SIM may not overlap in the time domain with Rx activity on the second SIM (or vice versa) (e.g., the multi-SIM UE may not have Tx activity on the first SIM concurrently with Rx activity on the second SIM) as the TDD pattern for the first SIM and the second SIM is the same.

In some cases, as shown by reference number 520, TDD patterns or TDD configurations associated with different network operators may not be synchronized (e.g., may be asynchronized) for a frequency band or frequency band group. For example, a TDD pattern for a first network operator may be different than a TDD pattern for a second network operator in the frequency band and/or the frequency band group (e.g., a pattern of uplink slots, downlink slots, and/or special slots may be different across the first network operator and the second network operator). Additionally, or alternatively, a timing or a slot boundary of the TDD pattern for the first network operator may be different than a timing or a slot boundary of the TDD pattern for the second network operator in the frequency band and/or the frequency band group (e.g., slot boundaries may occur at different times when using in the frequency band and/or the frequency band group for the first network operator and the second network operator). Therefore, if a multi-SIM UE establishes a communication connection associated with the first network operator on a first SIM (e.g., using the frequency band and/or the frequency band group) and a communication connection associated with the second network operator on a second SIM (e.g., using the frequency band and/or the frequency band group), then the TDD pattern or configuration for the first SIM may be different than the TDD pattern or configuration for the second SIM.

As a result, the multi-SIM UE may have activity (e.g., Tx activity) for the first SIM at the same time as activity (e.g., Rx activity) for the second SIM as an uplink slot of the TDD pattern for the first SIM may overlap in the time domain with a downlink slot of the TDD pattern for the second SIM. As explained in more detail below, the first SIM and the second SIM may share common antenna switches or antennas for communicating using the frequency band and/or the frequency band group. Therefore, the concurrent Tx activity on the first SIM and Rx activity on the second SIM may cause reliability issues and/or damage to hardware components of the UE.

As indicated above, FIG. 5 is provided as an example. Other examples may differ from what is described with regard to FIG. 5.

FIGS. 6A-6E are diagrams illustrating examples 600 of concurrent transmit and receive operations causing potential reliability issues in a multi-SIM UE, in accordance with the present disclosure. In some cases, as described herein, examples 600 relate to concurrent transmit and receive operations that may occur in a multi-SIM UE having DR-DSDS capabilities, whereby a first SIM (shown in FIGS. 6A-6E as SIM1) may operate in a connected mode in which Tx and Rx operations are enabled while a second SIM (shown in FIGS. 6A-6E as SIM2) may operate in an idle mode in which only Rx operations are enabled. Accordingly, in some cases, Rx activity associated with the second SIM may be concurrent with Tx activity associated with the first SIM.

Figure 6A:
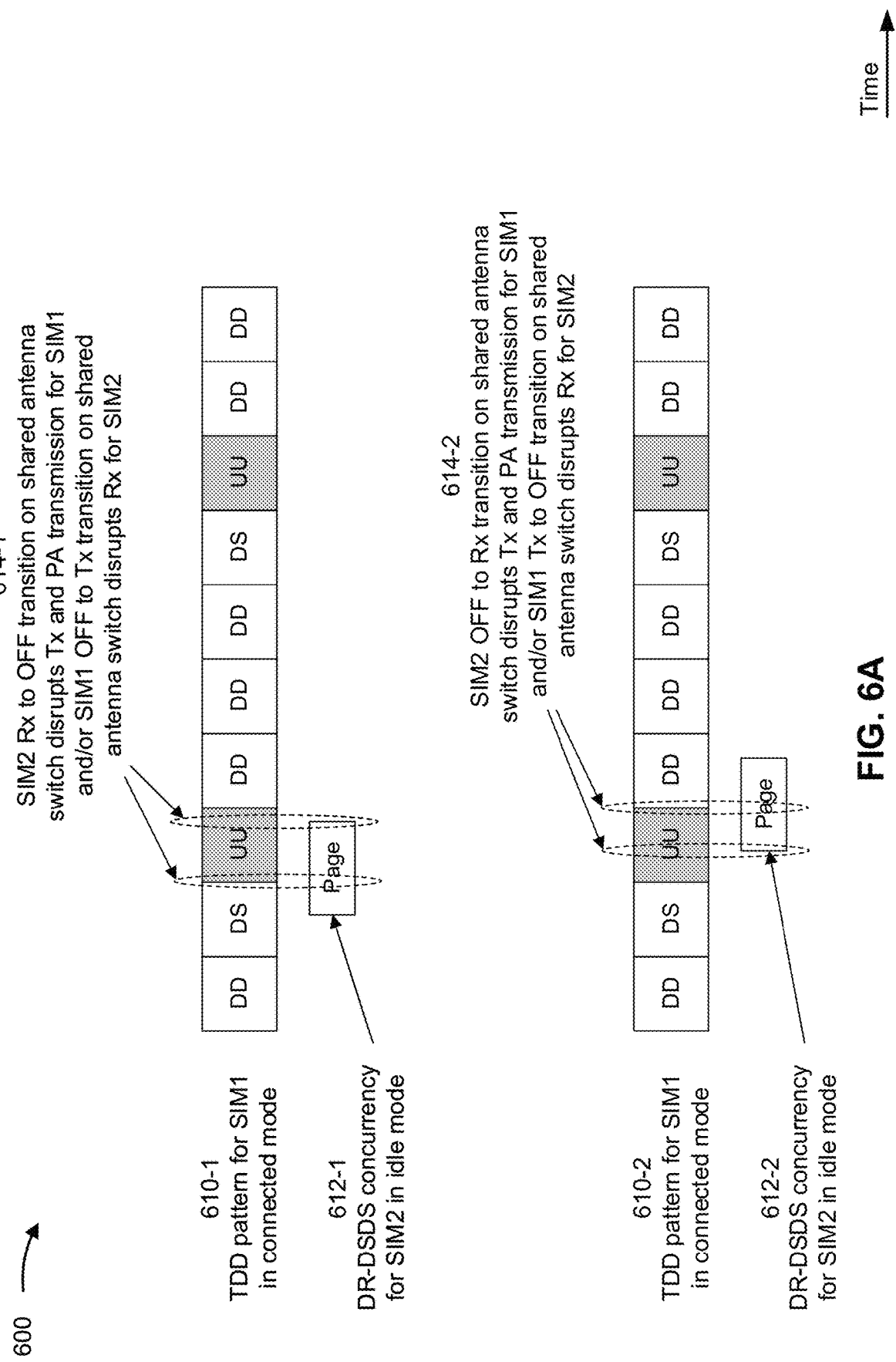
FIGS. 6A-6E are diagrams illustrating examples of concurrent transmit and receive operations causing potential reliability issues in a multiple SIM (multi-SIM) UE, in accordance with the present disclosure.
Figure 6B:
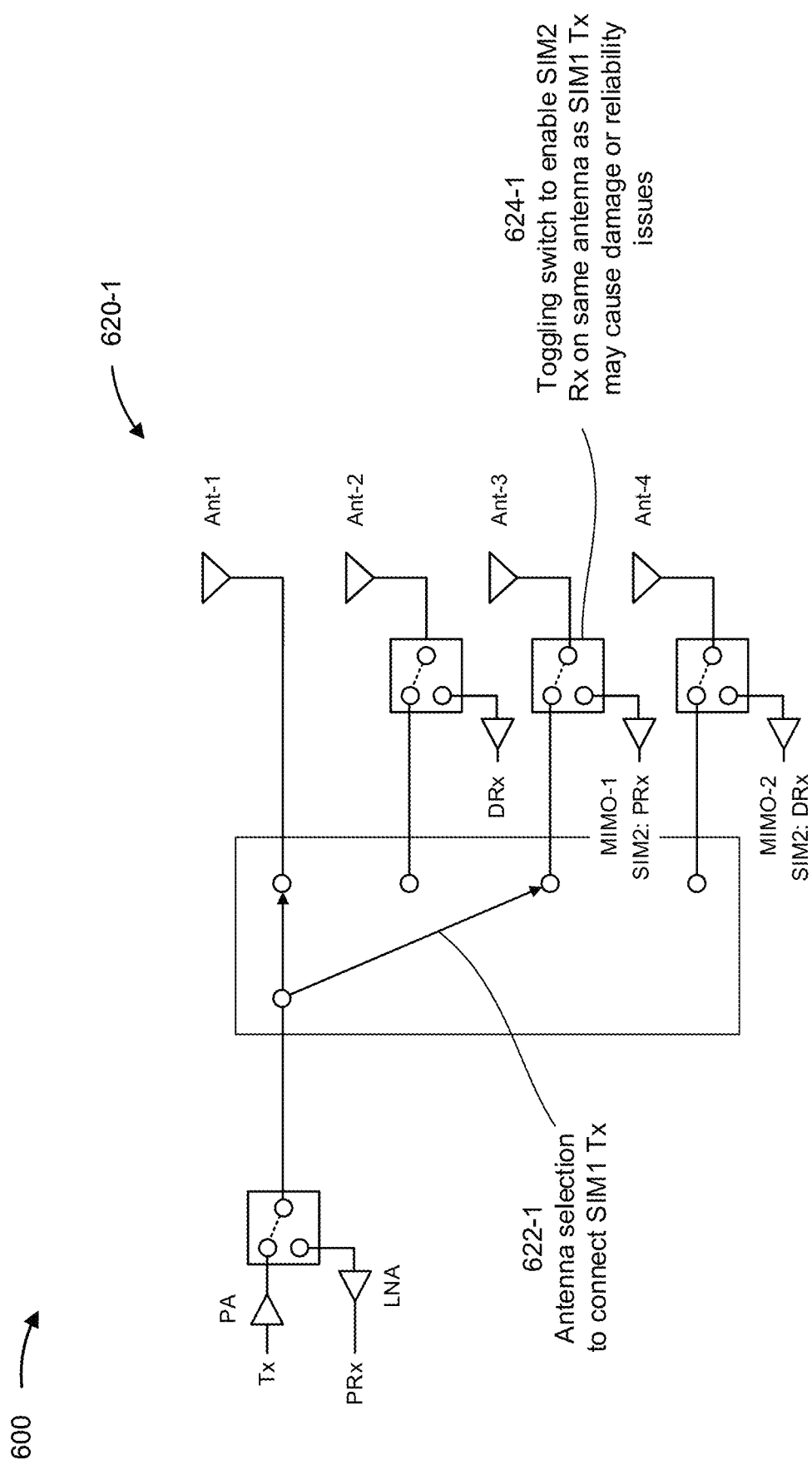

For example, as shown in FIG. 6A, and by reference numbers 610-1 and 610-2, a TDD pattern may be configured (e.g., by a base station) for the first SIM associated with the multi-SIM UE when the first SIM is in a connected mode. As described above in connection with FIG. 5, the TDD pattern may be associated with a network operator associated with the network and the frequency band and/or frequency band group for the communication connection for the first SIM.

As further shown in FIG. 6A, and by reference numbers 612-1 and 612-2, DR-DSDS concurrency may be enabled for the second SIM associated with the multi-SIM UE when the second SIM is in an idle mode. For example, the DR-DSDS concurrency may generally allow one SIM to conduct Rx operations concurrently with another SIM conducting Tx operations or Rx operations. In some cases, however, the first SIM and the second SIM may be associated with different wireless networks that are provided by different network operators, whereby the concurrent activity associated with the two SIMS may not be synchronized (e.g., the TDD patterns may not be synchronized as described above in connection with FIG. 5). In other words, Rx activity scheduled for the second SIM operating in idle mode may at least partially overlap in a time domain with Tx activity scheduled for the first SIM operating in connected mode.

For example, as shown by reference number 612-1, Rx activity such as paging reception may be scheduled for the second SIM (e.g., in a paging occasion associated with the multi-SIM UE) at a time that starts prior to the uplink slot for the first SIM and overlaps with the uplink slot in which Tx activity is scheduled for the first SIM. In this case, as shown by reference number 614-1, Tx activity for the first SIM may be disrupted and potentially cause damage or reliability issues for a power amplifier in a Tx chain when the second SIM transitions from performing Rx activity to an off state if the first SIM and the second SIM are connected to the same antenna switch. Additionally, or alternatively, Rx activity for the second SIM may be disrupted when the first SIM transitions from an off state to performing Tx activity if the first SIM and the second SIM are connected to the same antenna switch.

Additionally, or alternatively, as shown by reference number 612-2, Rx activity may be scheduled for the second SIM at a time that starts during the uplink slot for the first SIM. In this case, as shown by reference number 614-2, the second SIM transitioning from the off state to performing Rx activity may cause damage or reliability issues for the power amplifier in the Tx chain when there is ongoing Tx activity for the first SIM if the first SIM and the second SIM are connected to the same antenna switch. Additionally, or alternatively, Rx activity for the second SIM may be disrupted when the first SIM transitions from performing Tx activity to an off state if the first SIM and the second SIM are connected to the same antenna switch.

Accordingly, in cases where a multi-SIM UE having DR-DSDS capabilities includes a first SIM operating in connected mode and a second SIM operating in idle mode, Rx activity for the second SIM may cause damage or reliability issues associated with the first SIM in cases where the first SIM and the second SIM are sharing an antenna switch and the Rx activity for the second SIM at least partially overlaps in a time domain with the Tx activity for the first SIM. While the above examples have been described in connection with a DR-DSDS mode, similar problems may exist in any dual receive mode, such as a DR-DSDA mode, where the multi-SIM UE is capable of transmitting communications on a first SIM concurrently with receiving communications on a second SIM using the same antenna and/or antenna switch. For example, the second SIM may be operating in a connected mode (e.g., rather than an idle mode) in some aspects described herein.

FIGS. 6B-6E illustrate various examples 620-1, 620-2, 620-3, 620-4 of an RF architecture that includes multiple antennas and multiple antenna switches to support dual receive capabilities in a multi-SIM UE. For example, as shown in FIGS. 6B-6E, a SIM in connected mode may include a Tx chain with a power amplifier (PA) configured to transmit (e.g., deliver power) towards the multiple antennas. The power amplifier may be connected to a switching element that may toggle between the Tx chain and a low noise amplifier (LNA) associated with a primary receive (PRx) path. As shown in FIGS. 6B-6E by reference numbers 622-1 through 622-4, the switching element may be coupled to a dedicated antenna (Ant-1), and antenna selection may be performed (e.g., based on an Asdiv technique and/or an SRS antenna switching configuration) to connect the Tx chain to a second antenna (e.g., Ant-2, Ant-3, or Ant-4). For example, the multi-SIM UE may perform antenna switching (e.g., based on an Asdiv technique and/or an SRS antenna switching configuration) to identify a best antenna (e.g., an antenna associated with a best or highest measurement parameter, such as an RSRP parameter and/or a signal-to-noise ratio (SNR) parameter) among the available antennas of the multi-SIM UE.

Figure 6C:
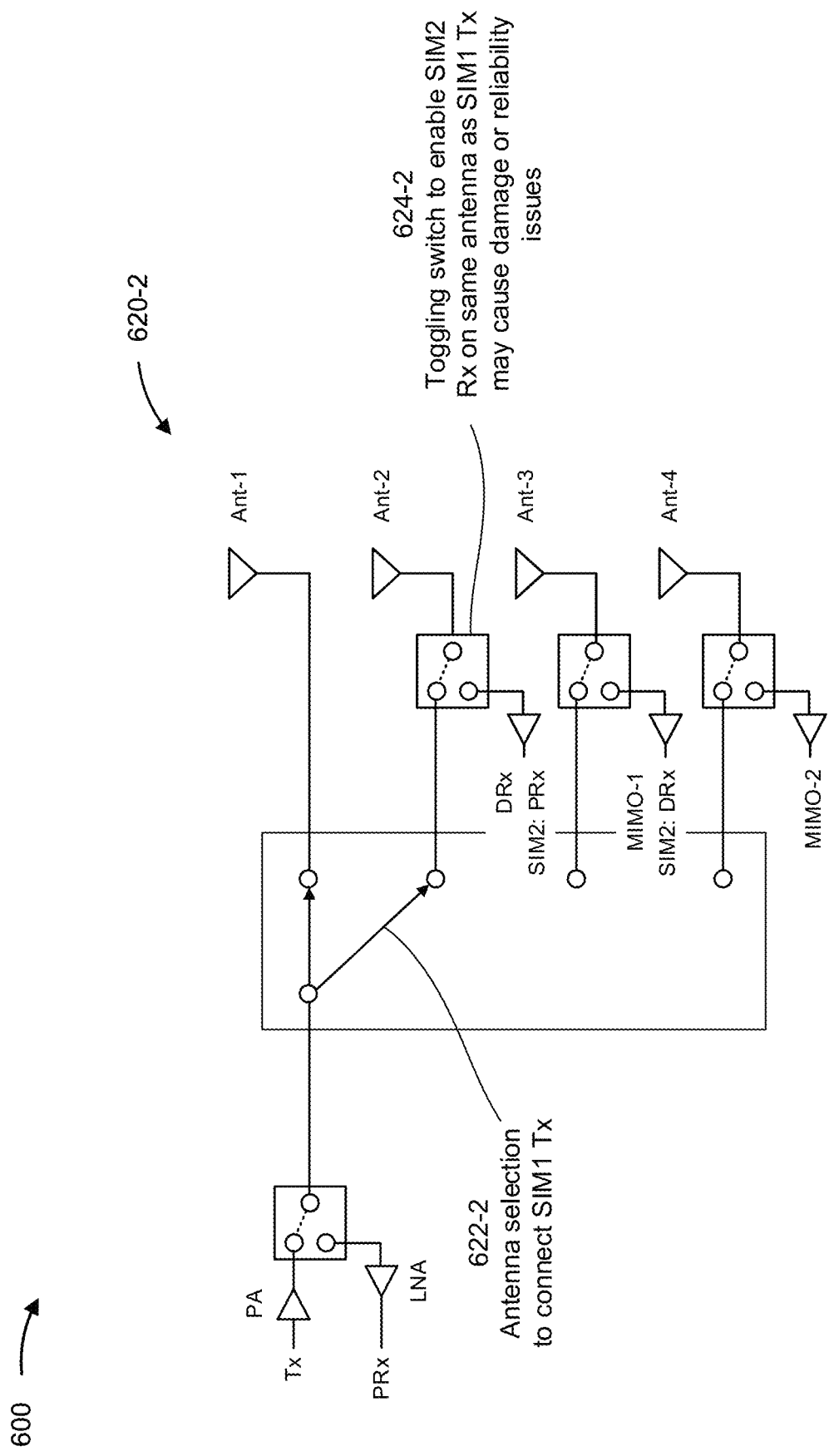
Figure 6D:
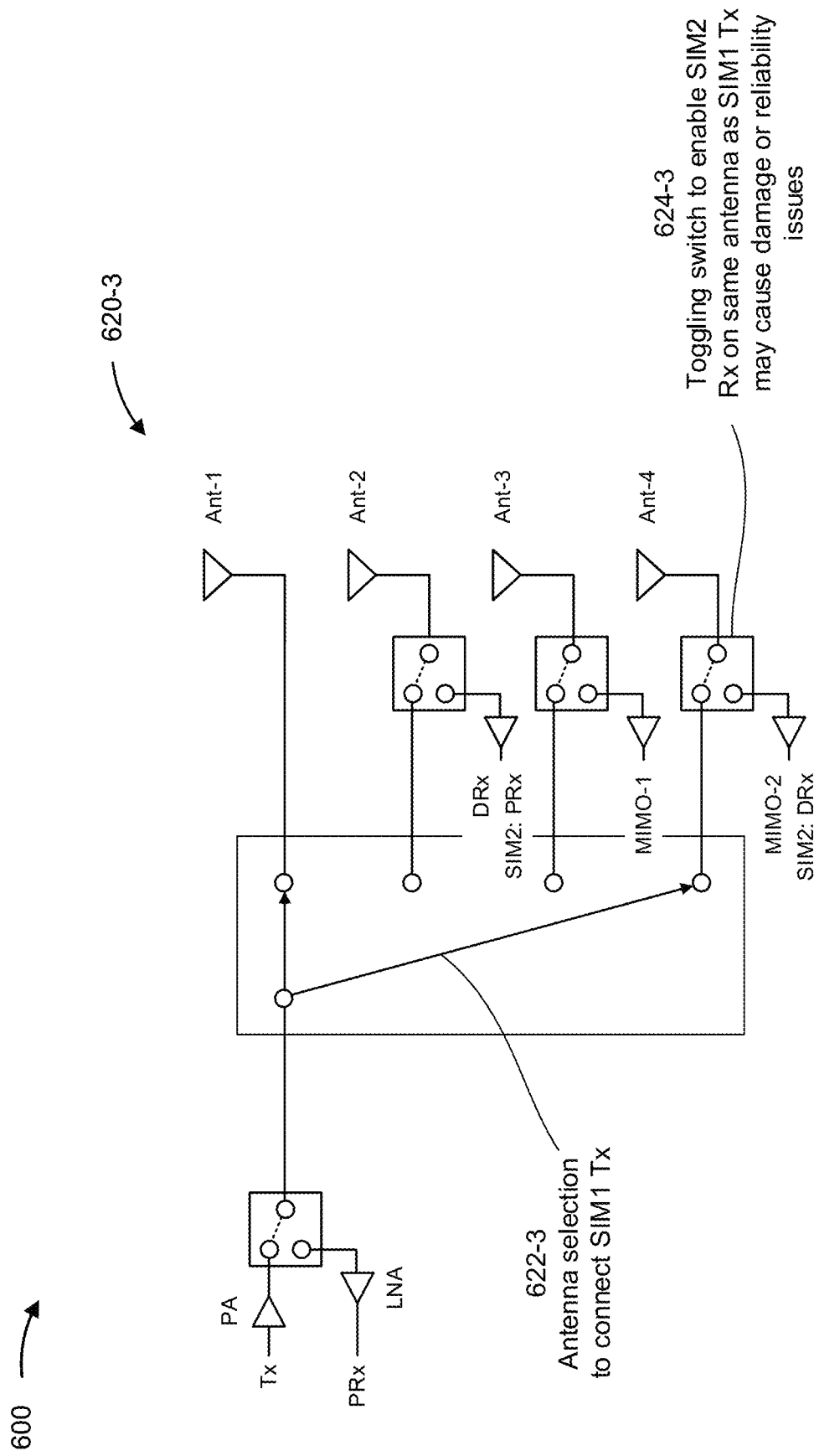
Figure 6E:
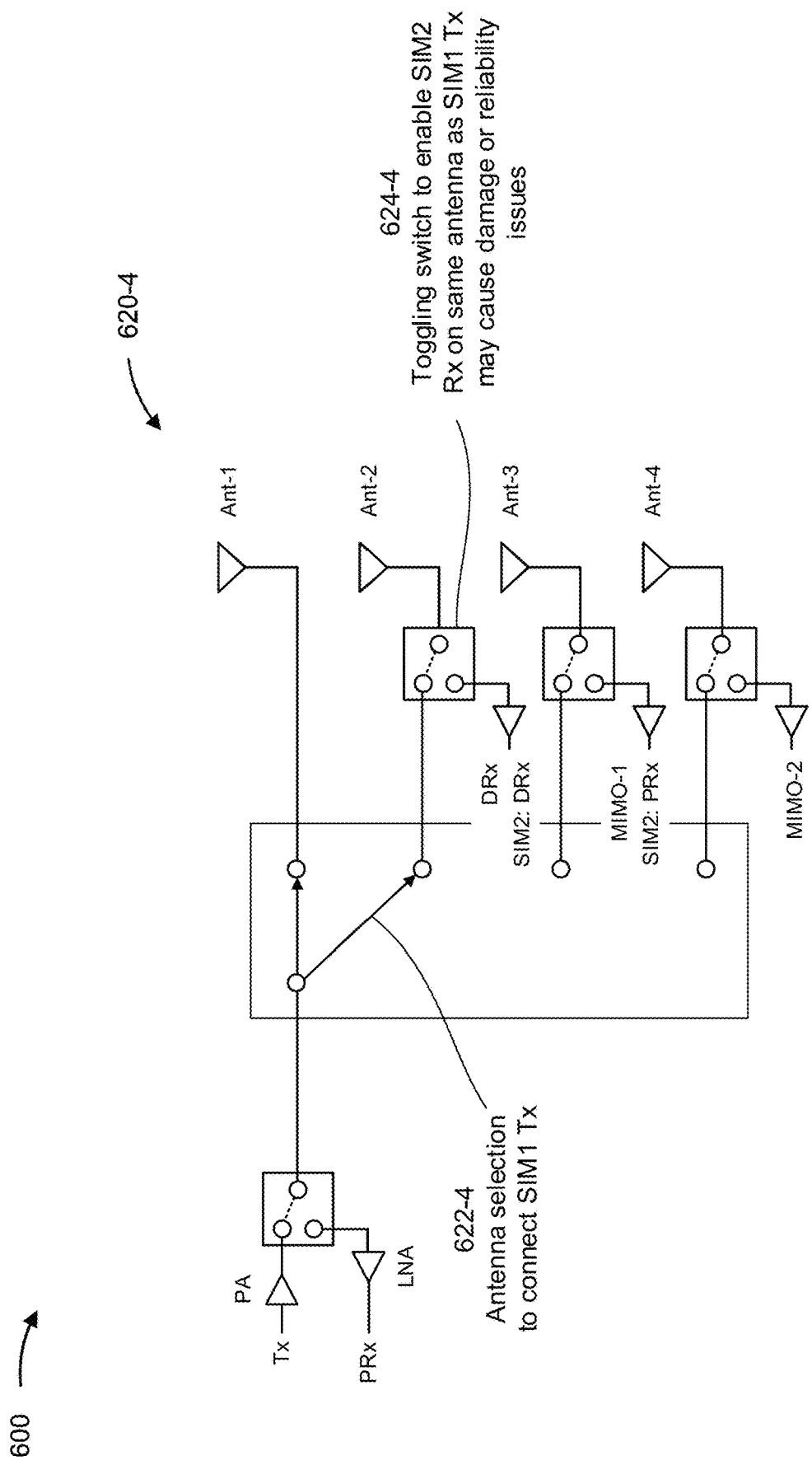

Accordingly, when the first SIM is in connected mode, the first SIM may be operating in an antenna switching mode, whereby the Tx chain associated with the first SIM can be switched among different antennas, while an Rx hardware path to the different antennas is in a default configuration (e.g., the Rx chain does not switch between different antennas to minimize RFFE loss due to switching). For example, in FIG. 6B, a diversity receive (DRx) path for the first SIM is connected to the second antenna, a PRx path for the second SIM is connected to the third antenna, and the DRx path for the second SIM is connected to the fourth antenna. In other examples, FIG. 6C illustrates an Rx configuration in which the DRx path for the first SIM and the PRx path for the second SIM are connected to the second antenna, and the DRx path for the second SIM is connected to the third antenna. FIG. 6D illustrates an Rx configuration in which the DRx path for the first SIM and the PRx path for the second SIM are connected to the second antenna, and the DRx path for the second SIM is connected to the fourth antenna. FIG. 6E illustrates an Rx configuration in which the DRx paths for the first and second SIM are both connected to the second antenna, while the PRx path for the second SIM is connected to the third antenna.

Accordingly, as shown by reference numbers 624-1 through 624-4, toggling an antenna switch to enable Rx activity for the second SIM on the antenna connected to the Tx chain of the first SIM may cause reliability for the Tx activity (e.g., communications to be transmitted) and/or may cause damage for the power amplifier in the Tx chain. For example, before the switch is toggled, the power amplifier is transmitting into a circuit that is terminated at the corresponding antenna. However, when the switch is toggled to enable Rx activity for the second SIM while there is ongoing Tx activity for the first SIM, the power amplifier may start to transmit into an open (e.g., unterminated) circuit, which causes the power to be reflected back towards the power amplifier. This may create a standing wave at the power amplifier, which may cause burnouts or reliability issues at the power amplifier. Additionally, or alternatively, toggling an antenna switch to enable Rx activity for the second SIM on the antenna connected to the Tx chain of the first SIM may cause the Tx activity to be terminated, resulting in dropped (e.g., not transmitted) communications or data. Similarly, toggling an antenna switch to enable Tx activity for the first SIM on the antenna connected to the Rx chain of the second SIM may cause the Rx activity to be terminated. Terminating the Tx activity and/or the Rx activity may degrade a communication performance of the multi-SIM UE when operating in a multi-SIM dual receive mode that includes the multi-SIM UE using antenna switching for a first SIM operating in connected mode and a second SIM that is enabled to concurrently receive communications.

Some techniques and apparatuses described herein enable antenna switching management in a multi-SIM dual receive mode. The antenna switching management may enable the multi-SIM UE to operate in a maximized antenna switching capability (e.g., a maximized Asdiv capability and/or a maximized SRS antenna switching capability) for a first SIM operating in a connected mode while also ensuring that Rx activity on a second SIM does cause reliability issues and/or damage to hardware components of the multi-SIM UE. For example, the multi-SIM UE may identify whether a first communication connection on the first SIM and a second communication connection on the second SIM are TDD synchronized (e.g., based at least in part on the frequency bands and/or the network operators associated with the first communication connection and the second communication connection).

If the first communication connection and the second communication connection are TDD synchronized, then the multi-SIM UE may operate in a maximized antenna switching capability (e.g., using all available antennas for the Asdiv technique and/or SRS antenna switching configuration). Additionally, the multi-SIM UE may use antenna(s) and/or antenna switch(es) for Rx activity of the second SIM that are the same as the antennas and/or antenna switches used for the antenna switching on the first SIM (e.g., as the Tx activity of the first SIM will not overlap in the time domain with the Rx activity of the second SIM due to the TDD synchronization). Operating using the maximized antenna switching capability improves the communication performance of the multi-SIM UE by enabling the multi-SIM UE to select a best antenna for transmitting communication (e.g., using the Asdiv technique and/or SRS antenna switching).

If the first communication connection and the second communication connection are not TDD synchronized, then the multi-SIM UE may operate in a reduced antenna switching capability. The reduced antenna switching capability may ensure that the antennas and/or antenna switches used for antenna switching by the first SIM do not include antennas and/or antenna switches used for Rx activity of the second SIM. For example, the multi-SIM UE may perform antenna switching on the first SIM using a first subset of antennas from the available antennas of the UE. The multi-SIM UE may perform Rx activity on the second SIM using a second subset (e.g., one or more) of antennas from the available antennas of the UE. The reduced antenna switching capability may indicate that the first subset of antennas and the second subset of antennas are not to include any common antennas and/or antenna switches. As a result, the multi-SIM UE may ensure that the same antenna and/or antenna switch are not used for Tx activity on the first SIM and Rx activity on the second SIM when there is not TDD synchronization between the first SIM and the second SIM.

Therefore, in some aspects, the multi-SIM UE may operate in a maximized antenna switching capability for the first SIM (e.g., to improve communication performance) when there is TDD synchronization between the first SIM and the second SIM. Alternatively, in some aspects, the multi-SIM may operate in a reduced antenna switching capability for the first SIM (e.g., to mitigate a risk or likelihood of reliability issues and/or damage to hardware components) when there is not TDD synchronization between the first SIM and the second SIM.

As indicated above, FIGS. 6A-6E are provided as examples. Other examples may differ from what is described with regard to FIGS. 6A-6E.

Figure 7:
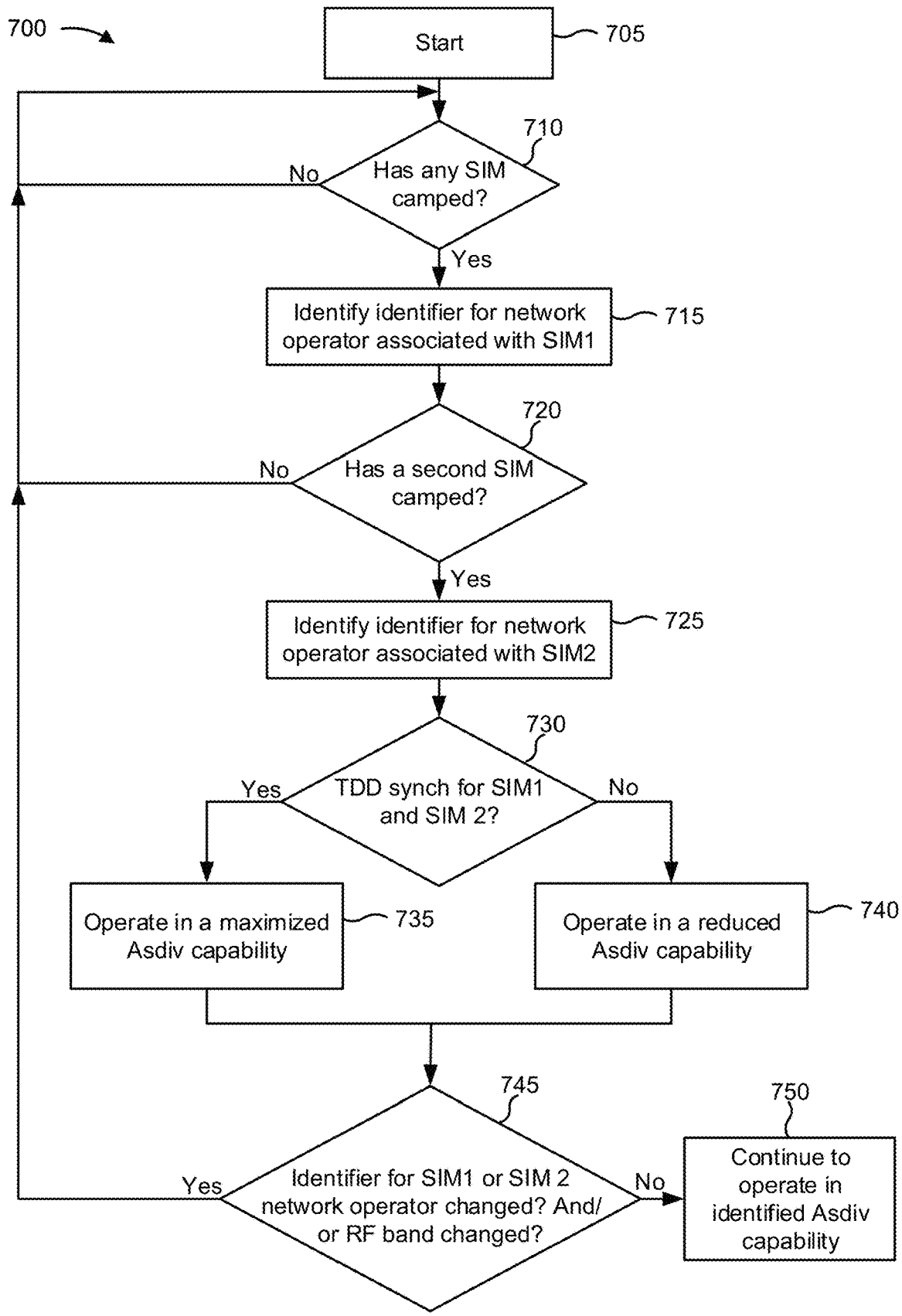
FIG. 7 is a diagram illustrating an example associated with antenna switching management in a multi-SIM mode, in accordance with the present disclosure.

FIG. 7 is a diagram illustrating an example 700 associated with antenna switching management in a multi-SIM mode, in accordance with the present disclosure. Example 700 may depict an example process where a multi-SIM UE performs operations associated with antenna switching management in a multi-SIM mode. As described in more detail below, the multi-SIM UE may have a first SIM (SIM1) and a second SIM (SIM2) that may support DR-DSDS capabilities, whereby one SIM can conduct Tx and Rx activities (e.g., in connected mode) concurrently with a second SIM conducting only Rx activities (e.g., in idle mode). Furthermore, the first SIM and the second SIM may share an RFFE of the multi-SIM UE that includes multiple antennas and multiple antenna switches or switching elements. For example, as described above, a Tx path associated with a SIM in connected mode may operate in an antenna switching mode, whereby the Tx path can be switched between different antennas and Rx paths to the antennas are in a default (e.g., static or fixed) configuration to minimize RFFE loss due to switching.

As shown by reference number 705, the operations performed by the multi-SIM UE as described herein may begin upon power up of the multi-SIM UE. For example, the multi-SIM UE may perform a boot up from an off state (e.g., powered down) to an on state (e.g., powered on). As shown by reference number 710, the multi-SIM UE may determine if any SIM of the multi-SIM UE has camped. "Camping" may refer to a SIM of the multi-SIM UE establishing a communication connection with a cell (e.g., with a wireless network). For example, the multi-SIM UE may establish a communication connection on the first SIM using a first frequency band (e.g., a first RF band) with a first wireless network (e.g., a first base station). The first wireless network (e.g., and/or the first base station) may be associated with a first network operator (e.g., a first MNO). As described above, the first SIM may be in a connected mode with the first wireless network, such that the first SIM is enabled to conduct both Tx and Rx activities.

As shown by reference number 715, the multi-SIM UE may identify a first identifier associated with the first network operator (e.g., that is associated with the first SIM). For example, the multi-SIM UE may receive activity registration information from the first SIM. The activity registration information may indicate one or more identifiers associated with the first network operator, such as a mobile country code (MCC) and/or a public land mobile network (PLMN) identifier (PLMN-ID). The one or more identifiers associated with the first network operator may provide an indication of a geographic location associated with a cell to which the first SIM is connected.

As shown by reference number 720, the multi-SIM UE may determine if a second SIM of the multi-SIM UE has camped. For example, the multi-SIM UE may establish a communication connection on the second SIM using a second frequency band (e.g., a second RF band) with a second wireless network (e.g., a second base station). The second wireless network (e.g., and/or the second base station) may be associated with a second network operator (e.g., a second MNO). As shown by reference number 725, the multi-SIM UE may identify a second identifier associated with the second network operator (e.g., that is associated with the second SIM). For example, the multi-SIM UE may receive activity registration information from the second SIM. The activity registration information may indicate one or more identifiers associated with the second network operator, such as an MCC and/or a PLMN-ID of the second network operator. The one or more identifiers associated with the second network operator may provide an indication of a geographic location associated with a cell to which the second SIM is connected.

In some aspects, the multi-SIM UE may detect that the first SIM and the second SIM are sharing one or more antennas and/or one or more antenna switches in a dual receive mode (e.g., while the first SIM is in connected mode and the second SIM is in idle mode). Accordingly, the first SIM may be allowed to conduct Tx and Rx operations in connected mode, and the second SIM may be allowed to concurrently conduct only Rx operations in idle mode. In some aspects, the multi-SIM UE may detect that the first SIM and the second SIM are sharing one or more antennas and/or one or more antenna switches based at least in part on the frequency bands used by the first SIM and the second SIM. For example, the first frequency band and the second frequency band may be associated with one or more common antennas and/or one or more common antenna switches. For example, the first frequency band (e.g., of the first SIM) and the second frequency band (e.g., of the second SIM) may be the same frequency band (e.g., the first frequency band and the second frequency band may be co-banded). In some aspects, a spectrum (e.g., a frequency range) of the first frequency band may at least partially overlap with a spectrum (e.g., a frequency range) of the second frequency band. In some aspects, where the first frequency band may be different than the second frequency band, the first frequency band and the second frequency band may be included in the same frequency band group and/or may use one or more common antennas and/or one or more common antenna switches of the multi-UE.

In cases where the multi-SIM UE detects that the first SIM and the second SIM are connected to the same antenna and/or the same antenna switch, the multi-SIM UE may determine that a potential condition exists whereby Rx activity associated with the second SIM may disrupt Tx activity associated with the first SIM and vice versa. For example, if the antenna switch shared by the first SIM and the second SIM is toggled such that the corresponding antenna connects to an Rx path of the second SIM (e.g., a PRx path or a DRx path), the power amplifier in the Tx chain of the first SIM may transmit power into an open circuit, which may cause the transmitted power to be reflected back towards the power amplifier and potentially cause damage or reliability issues for the power amplifier and/or may cause a transmission to be dropped (e.g., not transmitted). Accordingly, when the first SIM and the second SIM are sharing an antenna and/or an antenna switch while the first SIM is in connected mode and the second SIM is in idle mode, the multi-SIM UE may determine whether there is TDD synchronization between the first SIM and the second SIM based at least in part on the registration information received from the first SIM and the second SIM (e.g., based at least in part on the frequency bands and/or network operators used by the first SIM and the second SIM). "TDD synchronization between the first SIM and the second SIM" may refer to a TDD synchronization between a communication connection (e.g., to a base station) for the first SIM and a communication connection (e.g., to a base station) for the second SIM.

As shown by reference number 730, the multi-SIM UE may identify whether there is TDD synchronization between the first SIM and the second SIM. The multi-SIM UE may identify whether there is TDD synchronization between the first SIM and the second SIM based at least in part on the first frequency band and the second frequency band. Additionally, the multi-SIM UE may identify whether there is TDD synchronization between the first SIM and the second SIM based at least in part on the first network operator and the second network operator. As described above in connection with FIG. 5, for a frequency band and/or a frequency band group of two or more network operators may coordinate to ensure that the TDD pattern and/or TDD configuration is the same for the group of two or more network operators for UEs operating in the frequency band and/or the frequency band group. For example, the two or more network operators may enter into a network sharing agreement in which the two or more network operators agree to provide the same TDD pattern and/or TDD configuration for wireless networks provided by the two or more network operators (e.g., in the frequency band and/or the frequency band group).

A database that includes information identifying whether network operators are associated with TDD synchronization for different frequency bands may be configured at the multi-SIM UE. For example, the multi-SIM UE may be configured with the database. In some aspects, the database may be configured at the multi-SIM UE over-the-air (OTA). For example, the database may be indicated in an OTA message. The multi-SIM UE may store the database. In some aspects, the multi-SIM UE may receive updated information (e.g., indicating updated network operators that have TDD synchronization, updated frequency bands for existing TDD synchronization between network operators, and/or updating that network operators no longer have TDD synchronization) via an OTA message.

The multi-SIM UE may identify whether there is TDD synchronization between the first SIM and the second SIM based at least in part on performing one or more lookup operations in the database. For example, the multi-SIM UE may perform a lookup operation using the identifier of the first network operator (e.g., the PLMN-ID and/or the MCC) and the identifier of the second network operator. For example, the geographic location of the cell(s) to which the multi-SIM UE is connected (e.g., as indicated by the PLMN-IDs) may provide an indication as to whether there is TDD synchronization between the first SIM and the second SIM. The multi-SIM UE may identify whether there is TDD synchronization between the first network operator and the second network operator based at least in part on performing the lookup operation. For example, the database may indicate whether the first network operator and the second network operator are associated with a network sharing agreement. If the multi-SIM UE determines that there is not TDD synchronization between the first network operator and the second network operator (e.g., there is no network sharing agreement between the first network operator and the second network operator), then the multi-SIM UE may identify that there is no TDD synchronization between the first SIM and the second SIM.

If the multi-SIM UE determines that there is TDD synchronization between the first network operator and the second network operator (e.g., there is a network sharing agreement between the first network operator and the second network operator), then the multi-SIM UE may identify the frequency band(s) and/or frequency band group(s) associated with the TDD synchronization between the first network operator and the second network operator. For example, the database may indicate one or more frequency bands and/or one or more frequency band groups for which there is TDD synchronization between the first network operator and the second network operator. The multi-SIM UE may identify whether the first frequency band (e.g., of the first SIM) and the second frequency band (e.g., of the second SIM) are included in the one or more frequency bands and/or one or more frequency band groups for which there is TDD synchronization between the first network operator and the second network operator. If the multi-SIM UE determines that the first frequency band and the second frequency band are included in the one or more frequency bands and/or one or more frequency band groups, then the multi-SIM UE may identify that there is TDD synchronization between the first SIM and the second SIM. If the multi-SIM UE determines that the first frequency band and the second frequency band are not included in the one or more frequency bands and/or one or more frequency band groups, then the multi-SIM UE may identify that there is not TDD synchronization between the first SIM and the second SIM.

The multi-SIM UE may identify or set an antenna switching capability of the multi-SIM UE based at least in part on whether there is TDD synchronization between the first SIM and the second SIM. The antenna switching capability may be referred to herein as an Asdiv capability and/or an SRS antenna switching capability. The antenna switching capability may indicate a number of or a set of antennas that are available for Tx antenna switching on the first SIM.

For example, as described above, if there is TDD synchronization between the first SIM and the second SIM, there may not be a risk of Tx activity of the first SIM and Rx activity of the second SIM occurring at the same time using the same antenna and/or antenna switch. Therefore, as shown by reference number 735, the multi-SIM UE may operate in a maximized or full antenna switching capability (e.g., Asdiv capability). The maximized or full antenna switching capability may indicate that each antenna that is available for Tx activity (e.g., based at least in part on the first frequency band) on the first SIM is available for antenna switching. For example, if four antennas are available for the Tx activity on the first SIM, then the maximized or full antenna switching capability may indicate that the multi-SIM UE is enabled to switch between each of the four antennas to identify a best antenna for the Tx activity on the first SIM. Antenna switching (e.g., according to the Asdiv technique and/or the SRS antenna switching capability) may include the multi-SIM UE transmitting on a first antenna (e.g., and performing or receiving measurements associated with the transmission), switching the Tx chain to a second antenna, and transmitting on the second antenna (e.g., and performing or receiving measurements associated with the transmission). The multi-SIM UE may follow a similar process for each of the antennas that are available for the Tx activity on the first SIM while operating in the maximized or full antenna switching capability.

If the multi-SIM UE identifies that there is TDD synchronization between the first SIM and the second SIM, then the multi-SIM UE may identify that each antenna that is available for Rx activity (e.g., based at least in part on the first frequency band) on the second SIM is available to be selected as an Rx antenna in an Rx path (e.g., a PRx or a DRx) for the second SIM. For example, if four antennas are available for the Rx activity on the second SIM, the multi-SIM UE may select any two antennas (e.g., for a PRx path and a DRx path) for the Rx activity on the second SIM. As a result, the antennas available for antenna switching on the first SIM may overlap with the antennas that are available to be selected as an Rx antenna in an Rx path (e.g., a PRx or a DRx) for the second SIM. Therefore, as the multi-SIM UE has ensured that there is TDD synchronization between the first SIM and the second SIM, the multi-SIM UE may operate without limitations on antenna selections for the first SIM and the second SIM, as there is no risk of Tx activity of the first SIM and Rx activity of the second SIM occurring at the same time using the same antenna and/or antenna switch. The maximized or full antenna switching capability is depicted and described in more detail below in connection with FIG. 8A.

As shown by reference number 740, if the multi-SIM UE identifies that there is not TDD synchronization between the first SIM and the second SIM, then the multi-SIM UE may operate in a reduced antenna switching capability. The reduced antenna switching capability may indicate that a subset of antennas from a set of antennas that are available for Tx activity (e.g., based at least in part on the first frequency band) on the first SIM are available for antenna switching. For example, reduced antenna switching capability may indicate that the multi-SIM UE may not transmit communications on the first SIM using an antenna and/or antenna switch that is associated with (e.g., selected for) Rx activity on the second SIM. In some aspects, the antennas available for antenna switching on the first SIM may be based at least in part on selected antennas for Rx activity on the second SIM. Alternatively, the antennas available to be selected for Rx activity on the second SIM may be based at least in part on the antennas selected to be available for antenna switching on the first SIM.

For example, the reduced antenna switching capability may indicate a number of antenna elements that can be selected to be available for antenna switching on the first SIM. If there are four antennas available for the Tx activity on the first SIM, then the reduced antenna switching capability may indicate that the multi-SIM UE may select any two antennas, from the 4 available antennas, to be available for antenna switching on the first SIM. In some aspects, the number of antennas that can be selected to be available for antenna switching on the first SIM may be based at least in part on a number of antennas required for the Rx activity on the second SIM. For example, if the multi-SIM UE has four antennas and two antennas are required for the Rx activity on the second SIM (e.g., for a PRx path and a DRx path), then the number of antennas that can be selected to be available for antenna switching on the first SIM may be limited to two (e.g., of the four antennas). If only one antenna is required for the Rx activity on the second SIM (e.g., if the multi-SIM UE is experiencing good Rx channel conditions, such as a high RSRP or SNR), then the number of antennas that can be selected to be available for antenna switching on the first SIM may be limited to three (e.g., of the four antennas). The reduced antenna switching capability is depicted and described in more detail below in connection with FIG. 8B.

As a result, the reduced antenna switching capability may ensure that the multi-SIM UE can select antennas to be available for antenna switching on the first SIM and antennas to be available for Rx activity on the second SIM that are not the same (e.g., are not the same antennas and/or do not share a common antenna switch). As the first SIM and second SIM are not TDD synchronized, Tx activity on the first SIM may occur at the same time as Rx activity on the second SIM. Therefore, the reduced antenna switching capability may ensure that the problems described above in connection with FIGS. 6A-6E do not occur. For example, the reduced antenna switching capability may ensure that Tx activity on the first SIM does not disrupt Rx activity on the second SIM and/or cause damage to hardware components in the Rx path of the second SIM (e.g., to an LNA in the Rx path of the second SIM). Additionally, the reduced antenna switching capability may ensure that Rx activity on the second SIM does not disrupt Tx activity on the first SIM and/or cause damage to hardware components in the Tx path of the first SIM (e.g., to a power amplifier in the Tx path of the first SIM).

As shown by reference number 745, the multi-SIM UE may monitor the registration information for the first SIM and the second SIM to detect if an identifier of a network operator (e.g., a PLMN-ID and/or MCC) for the first SIM and/or the second SIM changes. Additionally, the multi-SIM UE may monitor the registration information for the first SIM and the second SIM to detect if a frequency band used by the first SIM and/or the second SIM changes. As shown by reference number 750, if the multi-SIM UE does not detect a change in the identifier of a network operator and/or a change in frequency band used by the first SIM and/or the second SIM, then the multi-SIM UE may continue to operate in the identified antenna switching capability (e.g., the maximized/full antenna switching capability or the reduced antenna switching capability), as described above. If the multi-SIM UE detects a change in the identifier of a network operator and/or a change in frequency band used by the first SIM and/or the second SIM, then the multi-SIM UE may perform one or more (or all) of the operations described above to identify if the first SIM and the second SIM are TDD synchronized and/or to identify an antenna switching capability for the first SIM. For example, if the multi-SIM UE detects a change in the identifier of a network operator, then the multi-SIM UE may identify if the first SIM and the second SIM are TDD synchronized using the new identifier for the network operator (e.g., as described above in connection with reference number 730).

Therefore, the multi-SIM UE may be enabled operate in a maximized or full antenna switching capability for the first SIM (e.g., to improve communication performance) when there is TDD synchronization between the first SIM and the second SIM. Alternatively, the multi-SIM may be enabled to operate in a reduced antenna switching capability for the first SIM (e.g., to mitigate a risk or likelihood of reliability issues and/or damage to hardware components) when there is not TDD synchronization between the first SIM and the second SIM.

As indicated above, FIG. 7 is provided as an example. Other examples may differ from what is described with regard to FIG. 7.

Figure 8A:
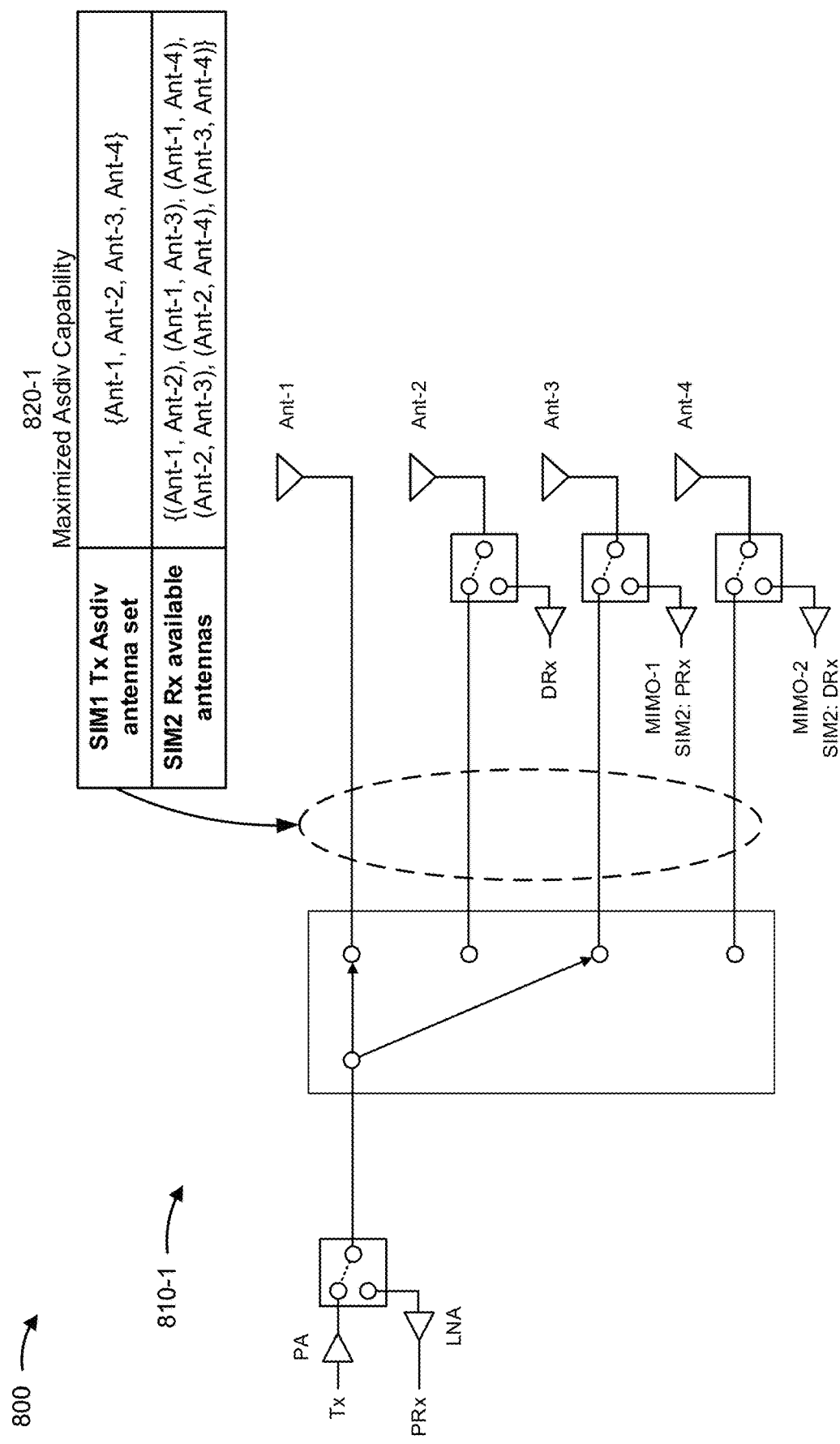
FIGS. 8A and 8B are diagrams illustrating examples associated with antenna switching management in a multi-SIM mode, in accordance with the present disclosure.
Figure 8B:
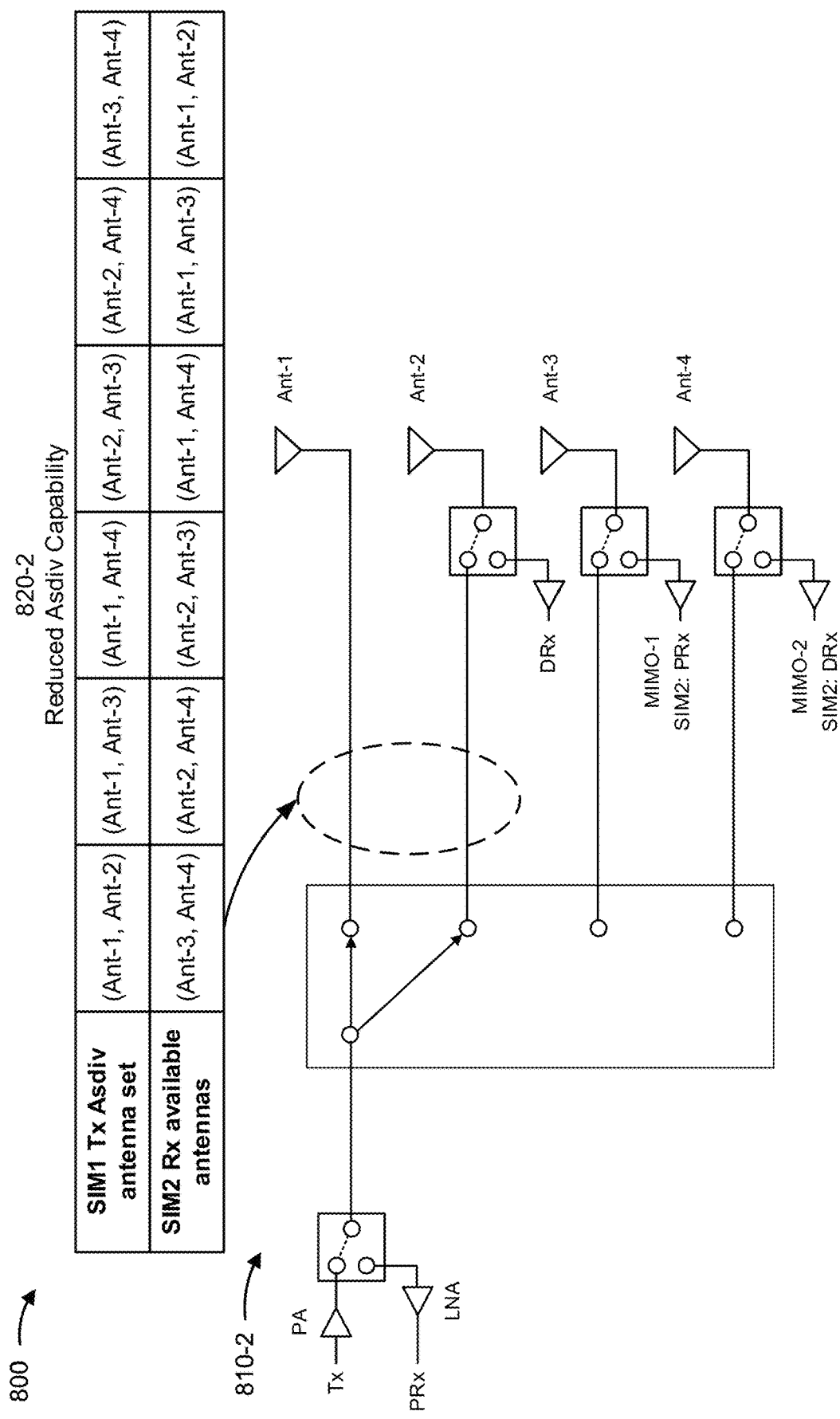

FIGS. 8A and 8B are diagrams illustrating examples 800 associated with antenna switching management in a multi-SIM mode, in accordance with the present disclosure. As described above, a multi-SIM UE may have a first SIM (SIM1) and a second SIM (SIM2) that may support DR-DSDS capabilities, whereby one SIM can conduct Tx and Rx activities (e.g., in connected mode) concurrently with a second SIM conducting Rx activities (e.g., in idle mode). Furthermore, the first SIM and the second SIM may share an RFFE of the multi-SIM UE that includes multiple antennas and multiple antenna switches or switching elements. For example, as described above, a Tx path associated with a SIM in connected mode may operate in an antenna switching mode, whereby the Tx path can be switched between different antennas and Rx paths to the antennas are in a default (e.g., static or fixed) configuration to minimize RFFE loss due to switching. FIGS. 8A-8B illustrate various examples 810-1 and 810-2 of an RF architecture associated with antenna switching management in a multi-SIM mode when one SIM can conduct Tx and Rx activities (e.g., in connected mode) concurrently with a second SIM conducting Rx activities (e.g., in idle mode).

As shown in FIG. 8A, the example RF architecture 810-1 may be associated with a maximized or full antenna switching capability, as described above in connection with FIG. 7. For example, FIG. 8A depicts an example in which the first SIM and the second SIM of the multi-SIM UE may be TDD synchronized. As shown in example 810-1, the multi-SIM UE may select a third antenna (e.g., Ant-3) of the multi-SIM UE for a Tx path of the first SIM (e.g., based at least in part on performing antenna switching). Additionally, as shown in example 810-1, the third antenna may be selected as an Rx antenna for an Rx path (e.g., a PRx path) of the second SIM. As the multi-SIM UE has identified that the first SIM and the second SIM are TDD synchronized, the overlap in the antenna and/or antenna switch for the Tx path of the first SIM Rx path of the second SIM may be permissible as the TDD synchronization ensures that Tx activity of the first SIM and Rx activity of the second SIM will not occur at the same time.

As shown by reference number 820-1, an example of a maximized antenna switching capability (e.g., Asdiv capability and/or SRS antenna switching capability) for the RF architecture depicted in FIG. 8A is shown. For example, the maximized antenna switching capability may indicate that available antennas for antenna switching on the first SIM (e.g., SIM1 Tx Asdiv antenna set as shown in FIG. 8A) may include all available antennas of the multi-SIM UE (e.g., Ant-1, Ant-2, Ant-3, and Ant-4). In other words, the multi-SIM UE is enabled to perform antenna switching for the first SIM using all available antennas of the multi-SIM UE (e.g., Ant-1, Ant-2, Ant-3, and Ant-4). Therefore, the multi-SIM UE may iterate through Ant-1, Ant-2, Ant-3, and Ant-4 (e.g., may switch the Tx path for the first SIM between Ant-1, Ant-2, Ant-3, and Ant-4) to identify a best antenna for the Tx activity for the first SIM. The multi-SIM UE may then use the identified best antenna for transmitting one or more communications for the first SIM.

As further shown in FIG. 8A, the maximized antenna switching capability may indicate that any two antennas of the multi-SIM UE are available for Rx activity for the second SIM. For example, as shown in FIG. 8A, the third antenna (Ant-3) is selected for a PRx path of the second SIM and the fourth antenna (Ant-4) is selected for a DRx path of the second SIM. However, as shown by reference number 820-1, any two antennas may be selected for the Rx path(s) of the second SIM (e.g., for a PRx path and a DRx path of the second SIM).

As shown in FIG. 8B, the example RF architecture 810-2 may be associated with a reduced antenna switching capability (e.g., as described above in connection with FIG. 7). For example, FIG. 8B may depict an example in which the first SIM and the second SIM of the multi-SIM UE are not TDD synchronized. As shown in example 810-2, the multi-SIM UE may select a second antenna (e.g., Ant-2) of the multi-SIM UE for a Tx path of the first SIM (e.g., based at least in part on performing antenna switching among a subset of the antennas, as described above). As further shown in FIG. 8B, the multi-SIM UE may select a third antenna (e.g., Ant-3) of the multi-SIM UE for an Rx path (e.g., a PRx path) of the second SIM and a fourth antenna (e.g., Ant-4) of the multi-SIM UE for another Rx path (e.g., a DRx path) of the second SIM. As shown in FIG. 8B, the first antenna (e.g., Ant-1) and the second antenna may be available for antenna switching on the first SIM and the third antenna and fourth antenna may be available for Rx activity on the second SIM. Therefore, the antennas (and antenna switches) available for the first SIM and the second SIM may not overlap (e.g., as the first SIM and the second SIM are not TDD synchronized). As a result, if Tx activity on the first SIM and Rx activity on the second SIM occur at the same time (e.g., due to the TDD asynchronization), then a risk of communication disruptions and/or damage to hardware components is mitigated as the Tx activity and the Rx activity will use different antennas and/or different antenna switches.

As shown by reference number 820-2, an example of a reduced antenna switching capability (e.g., Asdiv capability and/or SRS antenna switching capability) for the RF architecture depicted in FIG. 8B is shown. The reduced antenna switching capability may indicate a number of antennas available for antenna switching on the first SIM. For example, as shown in FIG. 8B, the number of antennas available for antenna switching on the first SIM is two. As described above, the number of antennas available for antenna switching on the first SIM may be based at least in part on a number of antennas required for Rx activity on the second SIM. For example, as shown in FIG. 8B, the number of antennas required for Rx activity on the second SIM is two. Therefore, the first SIM may be allocated two antennas (e.g., out of the four antennas of the multi-SIM UE) for antenna switching, and the second SIM may be allocated a different two antennas (e.g., out of the four antennas of the multi-SIM UE) for Rx activity. For example, if the number of antennas required for Rx activity on the second SIM is one, then the first SIM may be allocated three antennas (e.g., out of the four antennas of the multi-SIM UE) for antenna switching, and the second SIM may be allocated a single antenna (e.g., that is different than the three antennas associated with the first SIM) for Rx activity.

As shown by reference number 820-2, different combinations of antennas available for antenna switching on the first SIM and antennas available for Rx activity on the second SIM for the RF architecture depicted in FIG. 8B are shown. For example, as described above, if the first antenna and the second antenna are available for antenna switching on the first SIM, then the third antenna and the fourth antenna may be available for Rx activity on the second SIM. If the first antenna and the third antenna are available for antenna switching on the first SIM, then the second antenna and the fourth antenna may be available for Rx activity on the second SIM. If the first antenna and the fourth antenna are available for antenna switching on the first SIM, then the second antenna and the third antenna may be available for Rx activity on the second SIM. If the second antenna and the third antenna are available for antenna switching on the first SIM, then the first antenna and the fourth antenna may be available for Rx activity on the second SIM. If the second antenna and the fourth antenna are available for antenna switching on the first SIM, then the first antenna and the third antenna may be available for Rx activity on the second SIM. If the third antenna and the fourth antenna are available for antenna switching on the first SIM, then the first antenna and the second antenna may be available for Rx activity on the second SIM.

The combinations described above are provided as examples and assume that four antennas are available (e.g., for the frequency band of the first SIM and/or the second SIM) and that two antennas are required for Rx activity on the second SIM. Other combinations are possible with a different number of antennas available of the multi-SIM UE (e.g., 2 antennas, 8 antennas, and/or 16 antennas) and/or different number of antennas required for Rx activity on the second SIM. Moreover, the example RF architecture depicted in FIGS. 8A and 8B show a single Tx path for the first SIM (e.g., the first SIM is a single-input-single-output (SISO) SIM). However, similar antenna switching management as described herein can be applied where the first SIM includes multiple Tx paths (e.g., where the first SIM is a MIMO SIM).

As indicated above, FIGS. 8A and 8B are provided as examples. Other examples may differ from what is described with regard to FIGS. 8A and 8B.

Figure 9:
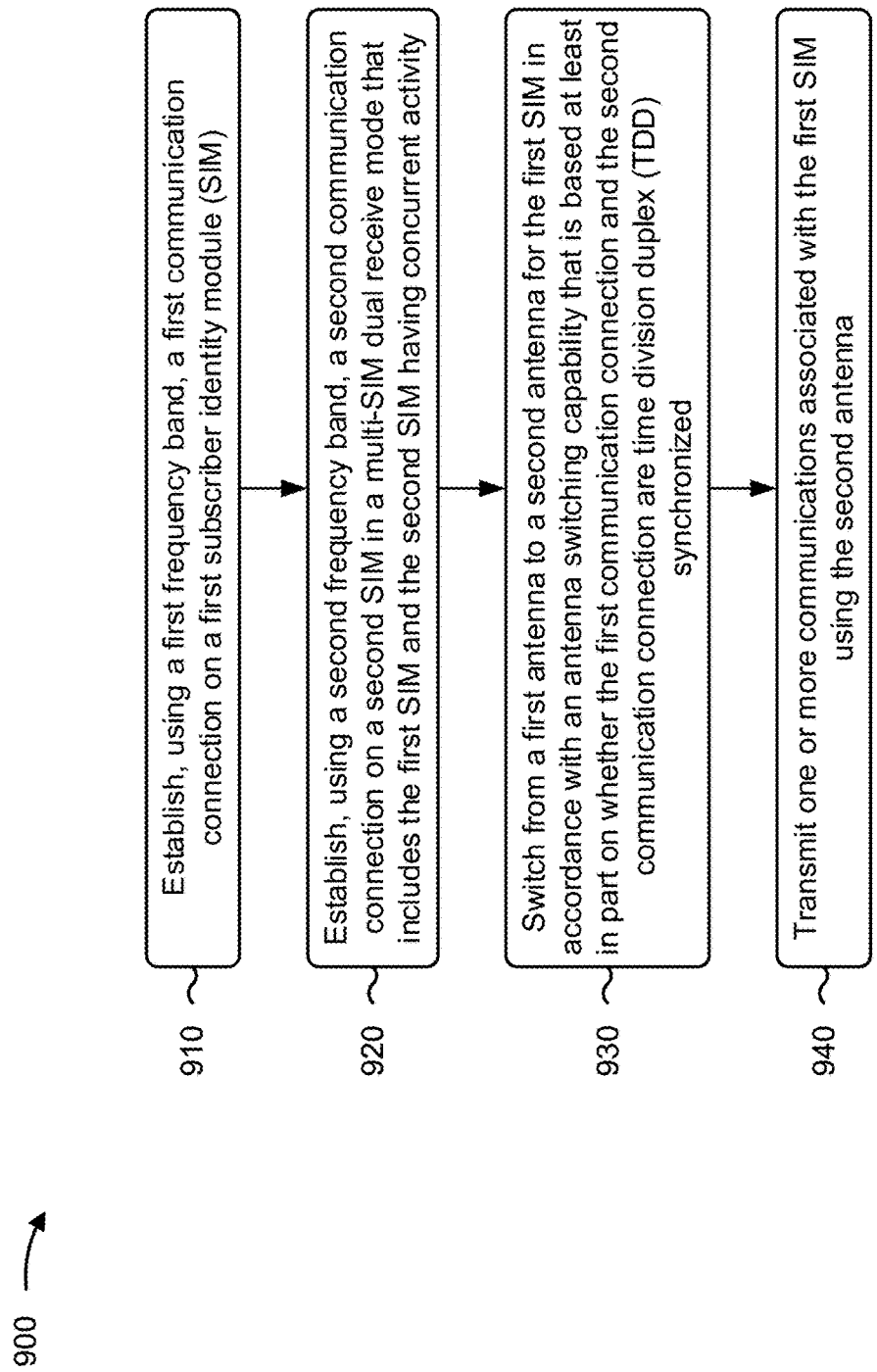
FIG. 9 is a diagram illustrating an example process associated with antenna switching management in a multi-SIM mode, in accordance with the present disclosure.

FIG. 9 is a diagram illustrating an example process 900 performed, for example, by a UE, in accordance with the present disclosure. Example process 900 is an example where the UE (e.g., UE 120 and/or a multi-SIM UE) performs operations associated with techniques for antenna switching management in a multi-SIM mode.

As shown in FIG. 9, in some aspects, process 900 may include establishing, using a first frequency band, a first communication connection on a first SIM (block 910). For example, the UE (e.g., using reception component 1002 and/or transmission component 1004, depicted in FIG. 10) may establish, using a first frequency band, a first communication connection on a first SIM, as described above.

As further shown in FIG. 9, in some aspects, process 900 may include establishing, using a second frequency band, a second communication connection on a second SIM in a multi-SIM dual receive mode that includes the first SIM and the second SIM having concurrent activity (block 920). For example, the UE (e.g., using reception component 1002 and/or transmission component 1004, depicted in FIG. 10) may establish, using a second frequency band, a second communication connection on a second SIM in a multi-SIM dual receive mode that includes the first SIM and the second SIM having concurrent activity, as described above.

As further shown in FIG. 9, in some aspects, process 900 may include switching from a first antenna to a second antenna for the first SIM in accordance with an antenna switching capability that is based at least in part on whether the first communication connection and the second communication connection are TDD synchronized (block 930). For example, the UE (e.g., using antenna switching component 1008, depicted in FIG. 10) may switch from a first antenna to a second antenna for the first SIM in accordance with an antenna switching capability that is based at least in part on whether the first communication connection and the second communication connection are TDD synchronized, as described above.

As further shown in FIG. 9, in some aspects, process 900 may include transmitting one or more communications associated with the first SIM using the second antenna (block 940). For example, the UE (e.g., using transmission component 1004, depicted in FIG. 10) may transmit one or more communications associated with the first SIM using the second antenna, as described above.

Process 900 may include additional aspects, such as any single aspect or any combination of aspects described below and/or in connection with one or more other processes described elsewhere herein.

In a first aspect, process 900 includes identifying, based at least in part on the first frequency band and the second frequency band, whether the first communication connection and the second communication connection are TDD synchronized.

In a second aspect, alone or in combination with the first aspect, establishing the first communication on the first SIM using the first frequency band includes establishing the first communication in a connected mode, and establishing the second communication on the second SIM using the second frequency band includes establishing the second communication in an idle mode.

In a third aspect, alone or in combination with one or more of the first and second aspects, the first frequency band and the second frequency band are a same frequency band.

In a fourth aspect, alone or in combination with one or more of the first through second aspects, a spectrum range of the first frequency band and a spectrum range of the second frequency band at least partially overlap.

In a fifth aspect, alone or in combination with one or more of the first through second aspects, the first frequency band and the second frequency band are different frequency bands included in a same frequency band group and the first frequency band and the second frequency band are associated with one or more common antennas of the UE.

In a sixth aspect, alone or in combination with one or more of the first through fifth aspects, process 900 includes identifying a first identifier associated with a first network operator for the first communication connection and the first SIM, and identifying a second identifier associated with a second network operator for the second communication connection and the second SIM.

In a seventh aspect, alone or in combination with the sixth aspect, the first identifier and the second identifier are at least one of a mobile country code, or a public land mobile network identifier.

In an eighth aspect, alone or in combination with one or more of the first through seventh aspects, process 900 includes identifying whether a first network operator associated with the first communication connection and a second network operator associated with the second communication connection are associated with TDD synchronization for the first frequency band and the second frequency band.

In a ninth aspect, alone or in combination with the eighth aspect, identifying whether the first network operator for the first communication connection and the first SIM and the second network operator for the second communication connection and the second SIM are associated with TDD synchronization for the first frequency band and the second frequency band includes performing a lookup operation in a database based at least in part on a first identifier associated with the first network operator and a second identifier associated with the second network operator, where the database includes information identifying whether network operators are associated with TDD synchronization for different frequency bands.

In a tenth aspect, alone or in combination with the ninth aspect, process 900 includes receiving an OTA message indicating updated information for the database.

In an eleventh aspect, alone or in combination with one or more of the first through tenth aspects, process 900 includes identifying whether a TDD configuration for the first communication connection is a same TDD configuration as a TDD configuration for the second communication connection.

In a twelfth aspect, alone or in combination with one or more of the first through eleventh aspects, process 900 includes identifying that the first communication connection and the second communication connection are TDD synchronized for the first frequency band and the second frequency band.

In a thirteenth aspect, alone or in combination with the twelfth aspect, process 900 includes identifying that the antenna switching capability indicates that the UE is enabled to use each antenna included in a set of antennas of the UE for antenna switching for the first communication connection based at least in part on identifying that the first communication connection and the second communication connection are TDD synchronized for the first frequency band and the second frequency band.

In a fourteenth aspect, alone or in combination with one or more of the twelfth through thirteenth aspects, transmitting the one or more communications associated with the first SIM includes identifying that the second antenna is a best antenna from a set of antennas of the UE using antenna switching, and transmitting the one or more communication using the second antenna.

In a fifteenth aspect, alone or in combination with one or more of the twelfth through fourteenth aspects, process 900 includes identifying a subset of antennas, from a set of antennas of the UE, to be associated with receive activity for the second communication connection, where the antenna switching capability indicates that each antenna included in the set of antennas is available to be included in the subset of antennas.

In a sixteenth aspect, alone or in combination with the fifteenth aspect, process 900 includes receiving, using the second communication connection, one or more communications using at least one antenna included in the subset of antennas.

In a seventeenth aspect, alone or in combination with one or more of the first through eleventh aspects, process 900 includes identifying that the first communication connection and the second communication connection are not TDD synchronized for the first frequency band and the second frequency band.

In an eighteenth aspect, alone or in combination with the seventeenth aspect, process 900 includes identifying that the antenna switching capability indicates that the UE is enabled to use a subset of antennas, from a set of antennas of the UE, for antenna switching for the first communication connection based at least in part on identifying that the first communication connection and the second communication connection are not TDD synchronized for the first frequency band and the second frequency band, where the subset of antennas does not include any antennas associated with receive activity for the second SIM.

In a nineteenth aspect, alone or in combination with the eighteenth aspect, transmitting the one or more communications associated with the first SIM includes identifying that the second antenna is a best antenna from the subset of antennas using antenna switching, and transmitting the one or more communication using the second antenna.

In a twentieth aspect, alone or in combination with one or more of the seventeenth through nineteenth aspects, process 900 includes identifying a first subset of antennas, from a set of antennas of the UE, to be associated with receive activity for the second communication connection, where the antenna switching capability indicates that the first subset of antennas is to include antennas that are different than antennas included in a second subset of antennas associated with transmit activity for the first communication connection.

In a twenty-first aspect, alone or in combination with the twentieth aspect, process 900 includes receiving, using the second communication connection, one or more communications using at least one antenna included in the first subset of antennas.

In a twenty-second aspect, alone or in combination with one or more of the first through twenty-first aspects, the UE is operating in a dual receive, dual SIM, dual standby mode.

In a twenty-third aspect, alone or in combination with one or more of the first through twenty-second aspects, the multi-SIM dual receive mode includes the first SIM and the second SIM being associated with at least one of one or more common antennas of the UE, or one or more common antenna switches of the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
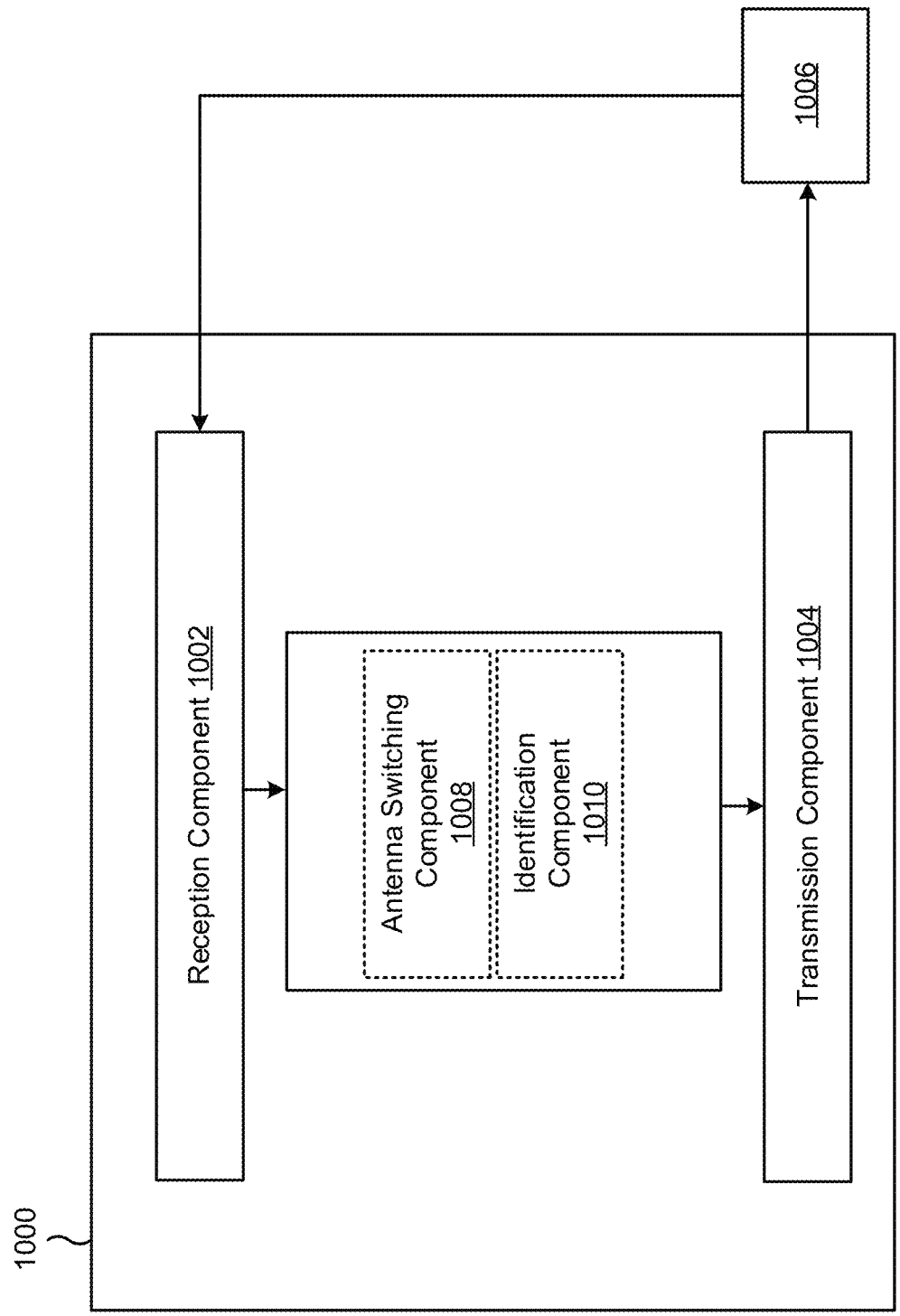
FIG. 10 is a block diagram of an example apparatus for wireless communication, in accordance with the present disclosure.

FIG. 10 is a block diagram of an example apparatus 1000 for wireless communication, in accordance with the present disclosure. The apparatus 1000 may be a UE, or a UE may include the apparatus 1000. The UE may be a multi-SIM UE, as described elsewhere herein. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of an antenna switching component 1008, and/or an identification component 1010, among other examples.

In some aspects, the apparatus 1000 may be configured to perform one or more operations described herein in connection with FIGS. 7, 8A, and 8B. Additionally, or alternatively, the apparatus 1000 may be configured to perform one or more processes described herein, such as process 900 of FIG. 9, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 and/or the transmission component 1004 may establish, using a first frequency band, a first communication connection on a first SIM. The reception component 1002 and/or the transmission component 1004 may establish, using a second frequency band, a second communication connection on a second SIM in a multi-SIM dual receive mode that includes the first SIM and the second SIM having concurrent activity. The antenna switching component 1008 may switch from a first antenna to a second antenna for the first SIM in accordance with an antenna switching capability that is based at least in part on whether the first communication connection and the second communication connection are TDD synchronized. The transmission component 1004 may transmit one or more communications associated with the first SIM using the second antenna.

The identification component 1010 may identify, based at least in part on the first frequency band and the second frequency band, whether the first communication connection and the second communication connection are TDD synchronized.

The identification component 1010 may identify a first identifier associated with a first network operator for the first communication connection and the first SIM.

The identification component 1010 may identify a second identifier associated with a second network operator for the second communication connection and the second SIM.

The identification component 1010 may identify whether a first network operator associated with the first communication connection and a second network operator associated with the second communication connection are associated with TDD synchronization for the first frequency band and the second frequency band.

The reception component 1002 may receive an OTA message indicating updated information for the database.

The identification component 1010 may identify whether a TDD configuration for the first communication connection is a same TDD configuration as a TDD configuration for the second communication connection.

The identification component 1010 may identify that the first communication connection and the second communication connection are TDD synchronized for the first frequency band and the second frequency band.

The identification component 1010 may identify that the antenna switching capability indicates that the UE is enabled to use each antenna included in a set of antennas of the UE for antenna switching for the first communication connection based at least in part on identifying that the first communication connection and the second communication connection are TDD synchronized for the first frequency band and the second frequency band.

The identification component 1010 may identify a subset of antennas, from a set of antennas of the UE, to be associated with receive activity for the second communication connection, where the antenna switching capability indicates that each antenna included in the set of antennas is available to be included in the subset of antennas.

The reception component 1002 may receive, using the second communication connection, one or more communications using at least one antenna included in the subset of antennas.

The identification component 1010 may identify that the first communication connection and the second communication connection are not TDD synchronized for the first frequency band and the second frequency band.

The identification component 1010 may identify that the antenna switching capability indicates that the UE is enabled to use a subset of antennas, from a set of antennas of the UE, for antenna switching for the first communication connection based at least in part on identifying that the first communication connection and the second communication connection are not TDD synchronized for the first frequency band and the second frequency band, wherein the subset of antennas does not include any antennas associated with receive activity for the second SIM.

The identification component 1010 may identify a first subset of antennas, from a set of antennas of the UE, to be associated with receive activity for the second communication connection, wherein the antenna switching capability indicates that the first subset of antennas is to include antennas that are different than antennas included in a second subset of antennas associated with transmit activity for the first communication connection.

The reception component 1002 may receive, using the second communication connection, one or more communications using at least one antenna included in the first subset of antennas.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: establishing, using a first frequency band, a first communication connection on a first subscriber identity module (SIM); establishing, using a second frequency band, a second communication connection on a second SIM in a multi-SIM dual receive mode that includes the first SIM and the second SIM having concurrent activity; switching from a first antenna to a second antenna for the first SIM in accordance with an antenna switching capability that is based at least in part on whether the first communication connection and the second communication connection are time division duplex (TDD) synchronized; and transmitting one or more communications associated with the first SIM using the second antenna.

Aspect 2: The method of Aspect 1, further comprising: identifying, based at least in part on the first frequency band and the second frequency band, whether the first communication connection and the second communication connection are TDD synchronized.

Aspect 3: The method of any of Aspects 1-2, wherein establishing the first communication on the first SIM using the first frequency band comprises: establishing the first communication in a connected mode, and wherein establishing the second communication on the second SIM using the second frequency band comprises: establishing the second communication in an idle mode.

Aspect 4: The method of any of Aspects 1-3, wherein the first frequency band and the second frequency band are a same frequency band.

Aspect 5: The method of any of Aspects 1-3, wherein a spectrum range of the first frequency band and a spectrum range of the second frequency band at least partially overlap.

Aspect 6: The method of any of Aspects 1-3, wherein the first frequency band and the second frequency band are different frequency bands included in a same frequency band group and the first frequency band and the second frequency band are associated with one or more common antennas of the UE.

Aspect 7: The method of any of Aspects 1-6, further comprising: identifying a first identifier associated with a first network operator for the first communication connection and the first SIM; and identifying a second identifier associated with a second network operator for the second communication connection and the second SIM.

Aspect 8: The method of Aspect 7, wherein the first identifier and the second identifier are at least one of: a mobile country code, or a public land mobile network identifier.

Aspect 9: The method of any of Aspects 1-8, further comprising: identifying whether a first network operator associated with the first communication connection and a second network operator associated with the second communication connection are associated with TDD synchronization for the first frequency band and the second frequency band.

Aspect 10: The method of Aspect 9, wherein identifying whether the first network operator for the first communication connection and the first SIM and the second network operator for the second communication connection and the second SIM are associated with TDD synchronization for the first frequency band and the second frequency band comprises: performing a lookup operation in a database based at least in part on a first identifier associated with the first network operator and a second identifier associated with the second network operator, wherein the database includes information identifying whether network operators are associated with TDD synchronization for different frequency bands.

Aspect 11: The method of Aspect 10, further comprising: receiving an over-the-air (OTA) message indicating updated information for the database.

Aspect 12: The method of any of Aspects 1-11, further comprising: identifying whether a TDD configuration for the first communication connection is a same TDD configuration as a TDD configuration for the second communication connection.

Aspect 13: The method of any of Aspects 1-12, further comprising: identifying that the first communication connection and the second communication connection are TDD synchronized for the first frequency band and the second frequency band.

Aspect 14: The method of Aspect 13, further comprising: identifying that the antenna switching capability indicates that the UE is enabled to use each antenna included in a set of antennas of the UE for antenna switching for the first communication connection based at least in part on identifying that the first communication connection and the second communication connection are TDD synchronized for the first frequency band and the second frequency band.

Aspect 15: The method of any of Aspects 13-14, wherein transmitting the one or more communications associated with the first SIM comprises: identifying that the second antenna is a best antenna from a set of antennas of the UE using antenna switching; and transmitting the one or more communication using the second antenna.

Aspect 16: The method of any of Aspects 13-15, further comprising: identifying a subset of antennas, from a set of antennas of the UE, to be associated with receive activity for the second communication connection, wherein the antenna switching capability indicates that each antenna included in the set of antennas is available to be included in the subset of antennas.

Aspect 17: The method of Aspect 16, further comprising: receiving, using the second communication connection, one or more communications using at least one antenna included in the subset of antennas.

Aspect 18: The method of any of Aspects 1-12, further comprising: identifying that the first communication connection and the second communication connection are not TDD synchronized for the first frequency band and the second frequency band.

Aspect 19: The method of Aspect 18, further comprising: identifying that the antenna switching capability indicates that the UE is enabled to use a subset of antennas, from a set of antennas of the UE, for antenna switching for the first communication connection based at least in part on identifying that the first communication connection and the second communication connection are not TDD synchronized for the first frequency band and the second frequency band, wherein the subset of antennas does not include any antennas associated with receive activity for the second SIM.

Aspect 20: The method of Aspect 19, wherein transmitting the one or more communications associated with the first SIM comprises: identifying that the second antenna is a best antenna from the subset of antennas using antenna switching; and transmitting the one or more communication using the second antenna.

Aspect 21: The method of any of Aspects 18-20, further comprising: identifying a first subset of antennas, from a set of antennas of the UE, to be associated with receive activity for the second communication connection, wherein the antenna switching capability indicates that the first subset of antennas is to include antennas that are different than antennas included in a second subset of antennas associated with transmit activity for the first communication connection.

Aspect 22: The method of Aspect 21, further comprising: receiving, using the second communication connection, one or more communications using at least one antenna included in the first subset of antennas.

Aspect 23: The method of any of Aspects 1-22, wherein the UE is operating in a dual receive, dual SIM, dual standby mode.

Aspect 24: The method of any of Aspects 1-23, wherein the multi-SIM dual receive mode includes the first SIM and the second SIM being associated with at least one of: one or more common antennas of the UE, or one or more common antenna switches of the UE.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the memory and the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    establishing, using a first frequency band, a first communication connection on a first subscriber identity module (SIM);
    establishing, using a second frequency band, a second communication connection on a second SIM in a multi-SIM dual receive mode that includes the first SIM and the second SIM having concurrent activity;
    switching from a first antenna to a second antenna for the first SIM in accordance with an antenna switching capability that is based at least in part on whether the first communication connection and the second communication connection are time division duplex (TDD) synchronized; and
    transmitting one or more communications associated with the first SIM using the second antenna.

2. The method of claim 1, further comprising:
    identifying, based at least in part on the first frequency band and the second frequency band, whether the first communication connection and the second communication connection are TDD synchronized.

3. The method of claim 1, wherein establishing the first communication connection on the first SIM using the first frequency band comprises:
    establishing the first communication connection in a connected mode, and
        wherein establishing the second communication connection on the second SIM using the second frequency band comprises:
    establishing the second communication connection in an idle mode.

4. The method of claim 1, wherein a spectrum range of the first frequency band and a spectrum range of the second frequency band at least partially overlap.

5. The method of claim 1, wherein the first frequency band and the second frequency band are different frequency bands included in a same frequency band group and the first frequency band and the second frequency band are associated with one or more common antennas of the UE.

6. The method of claim 1, further comprising:
    identifying whether a first network operator associated with the first communication connection and a second network operator associated with the second communication connection are associated with TDD synchronization for the first frequency band and the second frequency band.

7. The method of claim 6, wherein identifying whether the first network operator for the first communication connection and the first SIM and the second network operator for the second communication connection and the second SIM are associated with TDD synchronization for the first frequency band and the second frequency band comprises:

performing a lookup operation in a database based at least in part on a first identifier associated with the first network operator and a second identifier associated with the second network operator, wherein the database includes information identifying whether network operators are associated with TDD synchronization for different frequency bands.

8. The method of claim 7, further comprising:
receiving an over-the-air (OTA) message indicating updated information for the database.

9. The method of claim 1, further comprising:
identifying that the first communication connection and the second communication connection are TDD synchronized for the first frequency band and the second frequency band.

10. The method of claim 9, further comprising:
identifying that the antenna switching capability indicates that the UE is enabled to use each antenna included in a set of antennas of the UE for antenna switching for the first communication connection based at least in part on identifying that the first communication connection and the second communication connection are TDD synchronized for the first frequency band and the second frequency band.

11. The method of claim 9, wherein transmitting the one or more communications associated with the first SIM comprises:
identifying that the second antenna is a best antenna from a set of antennas of the UE using antenna switching; and
transmitting the one or more communication using the second antenna.

12. The method of claim 9, further comprising:
identifying a subset of antennas, from a set of antennas of the UE, to be associated with receive activity for the second communication connection, wherein the antenna switching capability indicates that each antenna included in the set of antennas is available to be included in the subset of antennas.

13. The method of claim 1, wherein the antenna switching capability is a reduced antenna switching capability in association with the first communication connection and the second communication connection being non-TDD synchronized.

14. The method of claim 13, wherein the reduced antenna switching capability is associated with a subset of antennas, including the second antenna, from a set of antennas that are available for transmit activity on the first SIM being available for antenna switching.

15. The method of claim 14, wherein a first number of antennas included in the subset of antennas is associated with a second number of antennas, of the set of antennas, that are associated with receive activity for the second SIM.

16. A user equipment (UE) for wireless communication, comprising:
one or more memories; and
one or more processors, coupled to the one or more memories, configured to:
establish, using a first frequency band, a first communication connection on a first subscriber identity module (SIM);
establish, using a second frequency band, a second communication connection on a second SIM in a multi-SIM dual receive mode that includes the first SIM and the second SIM having concurrent activity;
switch from a first antenna to a second antenna for the first SIM in accordance with an antenna switching capability that is based at least in part on whether the first communication connection and the second communication connection are time division duplex (TDD) synchronized; and
transmit one or more communications associated with the first SIM using the second antenna.

17. The UE of claim 16, wherein the one or more processors are further configured to:
identify, based at least in part on the first frequency band and the second frequency band, whether the first communication connection and the second communication connection are TDD synchronized.

18. The UE of claim 16, wherein the first frequency band and the second frequency band are a same frequency band.

19. The UE of claim 16, wherein the one or more processors are further configured to:
identify a first identifier associated with a first network operator for the first communication connection and the first SIM; and
identify a second identifier associated with a second network operator for the second communication connection and the second SIM.

20. The UE of claim 19, wherein the first identifier and the second identifier are at least one of:
a mobile country code, or
a public land mobile network identifier.

21. The UE of claim 16, wherein the one or more processors are further configured to:
identify whether a first network operator associated with the first communication connection and a second network operator associated with the second communication connection are associated with TDD synchronization for the first frequency band and the second frequency band.

22. The UE of claim 16, wherein the one or more processors are further configured to:
identify whether a TDD configuration for the first communication connection is a same TDD configuration as a TDD configuration for the second communication connection.

23. The UE of claim 16, wherein the one or more processors are further configured to:
identify that the first communication connection and the second communication connection are TDD synchronized for the first frequency band and the second frequency band; and
identify that the antenna switching capability indicates that the UE is enabled to use each antenna included in a set of antennas of the UE for antenna switching for the first communication connection based at least in part on identifying that the first communication connection and the second communication connection are TDD synchronized for the first frequency band and the second frequency band.

24. The UE of claim 16, wherein the one or more processors are further configured to:
identify that the first communication connection and the second communication connection are not TDD synchronized for the first frequency band and the second frequency band.

25. The UE of claim 24, wherein the one or more processors are further configured to:
identify that the antenna switching capability indicates that the UE is enabled to use a subset of antennas, from a set of antennas of the UE, for antenna switching for the first communication connection based at least in part on identifying that the first communication connection and the second communication connection are not TDD synchronized for the first frequency band and the second frequency band, wherein the subset of antennas does not include any antennas associated with receive activity for the second SIM.

26. The UE of claim 25, wherein the one or more processors, to transmit the one or more communications associated with the first SIM, are configured to:
identify that the second antenna is a best antenna from the subset of antennas using antenna switching; and
transmit the one or more communication using the second antenna.

27. The UE of claim 24, wherein the one or more processors are further configured to:
identify a first subset of antennas, from a set of antennas of the UE, to be associated with receive activity for the second communication connection, wherein the antenna switching capability indicates that the first subset of antennas is to include antennas that are different than antennas included in a second subset of antennas associated with transmit activity for the first communication connection.

28. The UE of claim 27, wherein the one or more processors are further configured to:
receive, using the second communication connection, one or more communications using at least one antenna included in the first subset of antennas.

29. A non-transitory computer-readable medium storing a set of instructions for wireless communication, the set of instructions comprising:
one or more instructions that, when executed by one or more processors of a user equipment (UE), cause the UE to:
establish, using a first frequency band, a first communication connection on a first subscriber identity module (SIM);
establish, using a second frequency band, a second communication connection on a second SIM in a multi-SIM dual receive mode that includes the first SIM and the second SIM having concurrent activity;
switch from a first antenna to a second antenna for the first SIM in accordance with an antenna switching capability that is based at least in part on whether the first communication connection and the second communication connection are time division duplex (TDD) synchronized; and
transmit one or more communications associated with the first SIM using the second antenna.

30. An apparatus for wireless communication, comprising:
means for establishing, using a first frequency band, a first communication connection on a first subscriber identity module (SIM);
means for establishing, using a second frequency band, a second communication connection on a second SIM in a multi-SIM dual receive mode that includes the first SIM and the second SIM having concurrent activity;
means for switching from a first antenna to a second antenna for the first SIM in accordance with an antenna switching capability that is based at least in part on whether the first communication connection and the second communication connection are time division duplex (TDD) synchronized; and
means for transmitting one or more communications associated with the first SIM using the second antenna.

* * * * *